United States Patent
Chintakindi

(10) Patent No.: US 11,054,278 B2
(45) Date of Patent: *Jul. 6, 2021

(54) ROAD FRUSTRATION INDEX RISK MAPPING AND MITIGATION

(71) Applicant: Allstate Insurance Company, Northbrook, IL (US)

(72) Inventor: Sunil Chintakindi, Menlo Park, CA (US)

(73) Assignee: Allstate Insurance Company, Northbrook, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/922,366

(22) Filed: Jul. 7, 2020

(65) Prior Publication Data

US 2020/0400459 A1    Dec. 24, 2020

Related U.S. Application Data

(63) Continuation of application No. 16/193,581, filed on Nov. 16, 2018, now Pat. No. 10,739,160, which is a (Continued)

(51) Int. Cl.
*G01C 21/36* (2006.01)
*G01C 21/34* (2006.01)

(52) U.S. Cl.
CPC ..... *G01C 21/3691* (2013.01); *G01C 21/3461* (2013.01); *G01C 21/3484* (2013.01)

(58) Field of Classification Search
CPC ............ G01C 21/3691; G01C 21/3461; G01C 21/3484
See application file for complete search history.

(56) References Cited

U.S. PATENT DOCUMENTS 7,839,292 B2  11/2010  Wang et al.
8,725,403 B2   5/2014  Aoki et al.
(Continued)

FOREIGN PATENT DOCUMENTS

CN       10526122 A      1/2016
DE     102011084640 A1   4/2013
(Continued)

OTHER PUBLICATIONS

Dec. 9, 2016—U.S. Notice of Allowance—U.S. Appl. No. 15/299,239.
(Continued)

*Primary Examiner* — Hussein El Chanti
(74) *Attorney, Agent, or Firm* — Banner & Witcoff, Ltd.

(57) ABSTRACT

A system for determining a road frustration index value includes a vehicle and a user computing device within the vehicle and a remote computing system, where a telematics system associated with the vehicle senses a speed of the vehicle. The computing device calculates, in near real-time and based on vehicle speed information and the road class of one or more route segments of a travel route, a first frustration level value associated with the driver of the vehicle and identify, based on whether the first frustration level value meets a criterion, an alternate route segment having second frustration level value predicted to be less than the first frustration level value. The remote computing system receives information associated with the first route segment and the alternate route segment and calculates insurance cost based on the road frustration index values associated with a route traveled in the vehicle.

20 Claims, 9 Drawing Sheets

Related U.S. Application Data continuation of application No. 15/802,639, filed on Nov. 3, 2017, now Pat. No. 10,132,644, which is a continuation of application No. 15/646,833, filed on Jul. 11, 2017, now Pat. No. 9,851,214, which is a continuation of application No. 15/296,915, filed on Oct. 18, 2016, now Pat. No. 9,739,627.

(56) References Cited

U.S. PATENT DOCUMENTS

| | | | |
|---|---|---|---|
| 8,924,240 | B2 | 12/2014 | Depura et al. |
| 9,050,045 | B2 | 6/2015 | Mori |
| 9,254,824 | B2 | 2/2016 | Ko et al. |
| 9,384,661 | B1 * | 7/2016 | DeLuca ............ G01C 21/3617 |
| 9,435,652 | B2 | 9/2016 | Ralston et al. |
| 9,739,627 | B1 * | 8/2017 | Chintakindi ....... G01C 21/3691 |
| 9,851,214 | B1 * | 12/2017 | Chintakindi ....... G01C 21/3461 |
| 10,132,644 | B2 * | 11/2018 | Chintakindi ....... G01C 21/3691 |
| 10,739,160 | B2 * | 8/2020 | Chintakindi ....... G01C 21/3484 |
| 2007/0124027 | A1 * | 5/2007 | Betzitza ................ B60W 40/02 701/1 |
| 2008/0147319 | A1 | 6/2008 | Cubillo |
| 2010/0110105 | A1 | 5/2010 | Kinnunen et al. |
| 2013/0194099 | A1 | 8/2013 | Nagata |
| 2013/0321401 | A1 | 12/2013 | Piemonte et al. |
| 2014/0277888 | A1 | 9/2014 | Dastoor et al. |
| 2015/0170512 | A1 | 6/2015 | Scofield |
| 2015/0183369 | A1 | 7/2015 | Fu |
| 2015/0191122 | A1 | 7/2015 | Roy et al. |
| 2015/0211868 | A1 | 7/2015 | Matsushita et al. |
| 2016/0019434 | A1 * | 1/2016 | Caldwell ............. G06K 9/4671 345/474 |
| 2016/0089954 | A1 * | 3/2016 | Rojas Villanueva ........................ B60H 1/00742 701/36 |
| 2016/0154538 | A1 | 6/2016 | Wang et al. |
| 2016/0189308 | A1 | 6/2016 | Bogovich et al. |
| 2016/0207540 | A1 | 7/2016 | Liu et al. |
| 2016/0209228 | A1 | 7/2016 | Golding et al. |
| 2017/0176198 | A1 * | 6/2017 | Tatourian .......... G06K 9/00845 |
| 2018/0126938 | A1 * | 5/2018 | Cordova ............. G08G 1/0112 |

FOREIGN PATENT DOCUMENTS

| | | |
|---|---|---|
| DE | 102015108416 A1 | 12/2015 |
| EP | 1882619 A1 | 1/2008 |
| EP | 2489566 A2 | 8/2012 |
| GB | 250662 A | 4/1926 |
| JP | 5362470 B2 | 12/2013 |
| KR | 201211943 | 2/2014 |

OTHER PUBLICATIONS

Juan (Susan) Pan et al., Proactive vehicle re-routing strategies for congestion avoidance, 8 pages, dated May 16, 2012.
Dwight A Hennessy et al., Traffic congestion, driver stress, and driver aggression, Agressive Behavior, vol. 25, pp. 409-423 (1999), 17 pages.
Dec. 22, 2016—U.S. Non-Final Office Action—U.S. Appl. No. 15/296,915.
Jan. 13, 2017—U.S. Notice of Allowance—U.S. Appl. No. 15/299,239.
Apr. 17, 2017—U.S. Notice of Allowance—U.S. Appl. No. 15/296,915.
Sep. 1, 2017—U.S. Notice of Allowance—U.S. Appl. No. 15/646,833.
Tarantilis et al., "Using a spatial decision support system for solving the vehicle routing 1-20 problem," Information & Management 39 (2002) p. 359-375.
Grey et al., "Driver Aggression: the Role of Personality, Social 1-20 Characteristics, Risk and Motivation," Transport and Communications, Mar. 1989.
Quddus et al., "A general map matching algorithm for transport telematics applications," GPS 1-20 Solutions, 7(3), pp. 157-167. Loughborough University 2003.
Mar. 30, 2018—U.S. Non-Final Office Action—U.S. Appl. No. 15/802,639.
Aug. 15, 2018—U.S. Notice of Allowance—U.S. Appl. No. 15/802,639.
Mar. 24, 2020—U.S. Non-Final Office Action—U.S. Appl. No. 16/134,711.
Apr. 9, 2020—U.S. Notice of Allowance—U.S. Appl. No. 16/193,581.
Jul. 15, 2020—U.S. Notice of Allowance—U.S. Appl. No. 16/134,711.
Jan. 18, 2018—(WO) International Search Report & Written Opinion— PCT/US17/57144.

* cited by examiner

RFI Table for Road Categorized as Highways and/or non-arterials

| DRIVING SPEED AS % OF SPEED LIMIT | SPEED RANGE | ROAD FRUSTRATION INDEX |
|---|---|---|
| x >= 100% | >= Speed Limit | 0 |
| a% <= x < 100% | Range 1 | 1 |
| b% <= x < a% | Range 2 | 2 |
| c% <= x < b% | Range 3 | 3 |
| d% <= x < c% | Range 4 | 4 |
| e% <= x < d% | Range 5 | 5 |
| f% <= x < e% | Range 6 | 6 |
| g% <= x < f% | Range 7 | 7 |
| h% <= x < g% | Range 8 | 8 |
| i% <= x < h% | Range 9 | 9 |
| j% <= x < i% | Range 10 | 9.9 |
| 0 (Road Closure) | 0 (Road Closure) | 10 |
| Bad speed/or invalid entry | | -1 |

Note: a% - k% are numerical percentages of the speed limit

FIG. 7

Travel Time Delay (TTD) Table for Road Categorized as Residential

| DRIVING SPEED AS % OF SPEED LIMIT | SPEED RANGE | ROAD FRUSTRATION INDEX | TTD Multiple |
|---|---|---|---|
| x >= 100% | >= Speed Limit | 0 | 1 |
| m% <= x < 100% | Range_11 | 1 | TTD 1 |
| n% <= x < m% | Range_12 | 2.5 | TTD 2 |
| o% <= x < n% | Range_13 | 3.5 | TTD 3 |
| p% <= x < o% | Range_14 | 5 | TTD 4 |
| q% <= x < p% | Range_15 | 7.5 | TTD 5 |
| s% <= x < r% | Range_16 | 9 | TTD 6 |
| t% <= x < s% | Range_17 | 9.9 | TTD 7 |
| 0 (Road Closure) | 0 (Road Closure) | 10 | N/A (Route Avoided) |
| Bad speed/or invalid entry | | -1 | N/A |

Note: m% - t% correspond to numerical percentages of the speed limit

ROAD FRUSTRATION INDEX RISK MAPPING AND MITIGATION

CROSS REFERENCE TO RELATED APPLICATIONS

This application is a continuation of patent application Ser. No. 16/193,581 entitled "Road Frustration Index Risk Mapping and Mitigation" that was filed on Nov. 16, 2018, which is a continuation of This application is a continuation of patent application Ser. No. 15/802,639 entitled "Road Frustration Index Risk Mapping and Mitigation" that was filed on Nov. 3, 2017 (now U.S. patent Ser. No. 10/132,644), which is a continuation of patent application Ser. No. 15/646,833 entitled "Road Frustration Index Risk Mapping and Mitigation" that was filed on Jul. 11, 2017, which is a continuation of patent application Ser. No. 15/296,915 entitled "Road Frustration Index Risk Mapping and Mitigation" that was filed on Oct. 18, 2016 (now U.S. Pat. No. 9,739,627), and is related to patent application Ser. No. 15/299,239 entitled "Road Frustration Index Risk Mapping and Mitigation", which is also a continuation of patent application Ser. No. 15/296,195 and issued on Apr. 18, 2017 as U.S. Pat. No. 9,625,266, both of which are incorporated by reference.

TECHNICAL FIELD

Aspects of this disclosure relate generally to risk mitigation. More particularly, aspects of this disclosure relate to using geographically encoded information to determine ways to mitigate risk by identifying and reducing driver frustration levels.

BACKGROUND

Drivers may experience varying levels of frustration while driving a route in a vehicle, particularly when the driver encounters unexpected delays due to abnormal driving conditions including, but not limited to, road, weather and/or traffic conditions. Studies have shown that frustrated drivers may be more likely to engage in risky behavior, particularly as their level of frustration increases. Although insurers may vary insurance premiums based on garaging location (by state, county, etc.), there is a need in the art for enhanced systems and methods to better account for variations due to location-based frustration experienced by drivers and subsequently acting accordingly. In some cases, insurers may use location-based technology such as GPS (global positioning satellites) to monitor the location of vehicles. Nevertheless, there is a need in the art for a technique for identifying and/or predicting a level of frustration associated with one or more route segments of a travel route using the various aspects disclosed by the present invention. Therefore, there is a benefit in the art for an enhanced method and device for calculating a frustration levels for a road segment and using it to, among other things, mitigate risk.

SUMMARY

Aspects of this disclosure overcome problems and limitations of the prior art by providing a method for mitigating the risks associated with drivers experiencing different levels of frustration, such as by assigning a frustration level to each of a plurality of road segments and using those frustration levels to identify a travel route that may reduce a level of frustration experienced by the driver and reduce the associated risks. In some cases, drivers may be incentivized by using those frustration levels and/or a driver's reaction to an indication of the frustration levels, such as by providing an insurance incentive (e.g., a rate variable on the level of frustration of a route and/or a driver's likelihood in accepting a provided alternate route with a reduced frustration level, a rate reduction corresponding to a driver's past or near-real time reaction to a provided frustration level, etc.).

Various approaches to helping users mitigate driving frustration are presented. In accordance with aspects of this disclosure, a system may include a vehicle, a computing device associated with a user travelling within the vehicle and/or a road frustration index computing system that may be communicatively coupled to the computing device. In some cases, a system for determining a road frustration index value may include a vehicle and/or a computing device associated with a user travelling within the vehicle. A telematics system associated with the vehicle may include a sensor to sense a speed of the vehicle. The computing device may receive, from the vehicle telematics device, speed information representative of a current vehicle speed and may receive, from a mobile location detection unit, information identifying a road class associated with each of a plurality of road segments of a route. The computing device may then calculate, in near real-time and based on the speed information and the road class, a first frustration level value associated with the driver of the vehicle and identify, based on whether the first frustration level value meets a criterion, an alternate route segment having second frustration level value predicted to be less than the first frustration level value.

In some cases, a vehicle may include an input device accessible to an occupant of the vehicle. The input device may be used to receive information regarding the occupant's emotional reaction (e.g., a sense of frustration) regarding a plurality of road segments upon which the vehicle is travelling. In some cases, the input device may comprise a pressure transducer, a switch, a microphone, or other form of input device. The vehicle may further include a communication interface communicatively coupled to the input device. The communication interface may be used for communicating the frustration information via a wireless communication protocol to a remote computing system. In some cases, the remote computing system may include a road frustration index analysis engine that may be used for analyzing the frustration information received from the user to determine a road frustration index value associated with the user corresponding to a particular road segment under the traffic and/or weather conditions experienced at the time of user of the input device.

The details of these and other embodiments of this disclosure are set forth in the accompanying drawings and description below. Other features and advantages of aspects of this disclosure will be apparent from the description and drawings.

BRIEF DESCRIPTION OF THE DRAWINGS

Aspects of this disclosure may take physical form in certain parts and steps, embodiments of which will be described in detail in the following description and illustrated in the accompanying drawings that form a part hereof, wherein:

FIG. 7 shows an illustrative table for use in determining a road frustration index for a driver according to aspects of this disclosure; and FIG. 8 shows an illustrative table for use in determining a travel time delay associated with an illustrative road segment for a driver according to aspects of this disclosure.

Figure 1A:
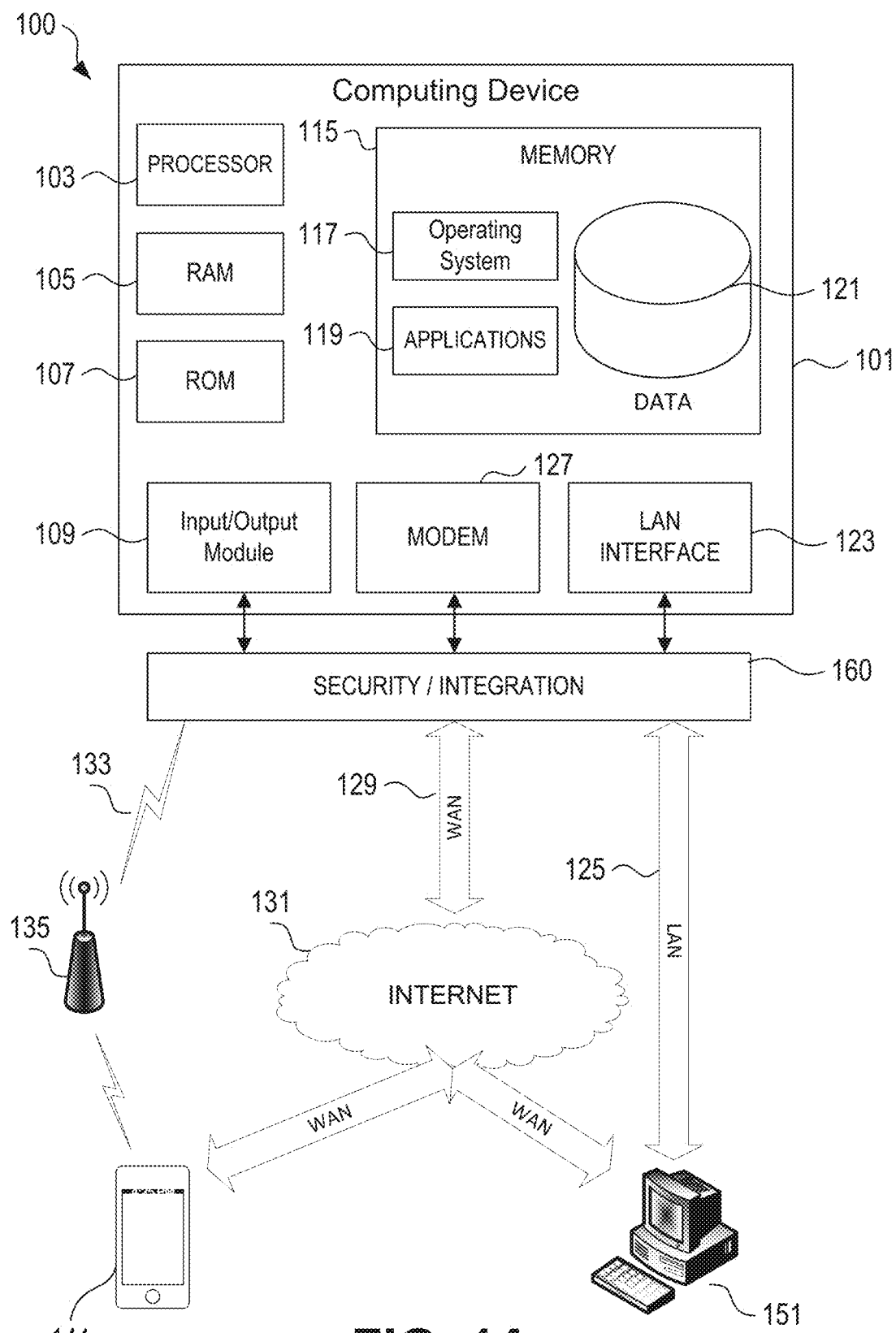
FIGS. 1A and 1B depict illustrative block diagrams of operating environments in accordance with aspects of this disclosure.

It will be apparent to one skilled in the art after review of the entirety disclosed that the steps illustrated in the figures listed above may be performed in other than the recited order, and that one or more steps illustrated in these figures may be optional.

DETAILED DESCRIPTION

Systems and methods in accordance with aspects of this disclosure may be provided to generate a road frustration index value corresponding to a level of frustration being experienced (or predicted to be experienced) by a driver along one or more road segments. In some cases, the road frustration index values may be provided to a user, such as by creating a map reflecting an associated road frustration index values for a plurality of road segments along a driving route. Such a map may be generated using information received from a vehicle associated with the user regarding at least a vehicle speed. In some cases, one or more inputs may be provided to allow a driver to enter information corresponding to the driver's feeling of frustration (e.g., high, medium, low, etc.) as the vehicle travels along a particular route segment. For example, the driver may provide information corresponding to a low level of frustration along a route segment on which the vehicle is traveling at near the rated speed, or a high level of frustration when the vehicle is traveling at a low level of speed. In some cases, the road frustration index may be modeled based on a mathematical equation based on a vehicle speed and a road classification type (e.g., highway, non-arterial, subdivision, residential, city, country, etc.). In some cases, additional information may be used when calculating and/or predicting a road frustration index value, such as by using historical traffic information, time of day information, weather information, and/or the like. In some cases, the road frustration index value may be generated local to the driver, such as on a computing device located in the vehicle (e.g., a vehicle computing system, a mobile phone, a laptop computer, etc.) In some cases, the road frustration index value may be generated local to the driver, such as on a computing device remotely located from the vehicle, such as at a business organization computing system (e.g., an insurance agency computing system comprising a road frustration index evaluation system, etc.).

In some cases, one or more conditions experienced by the driver may have an effect on a level of frustration being experienced by the driver and may be included in a calculation of a road frustration index value for one or more road segments of a travel route. Such conditions may include, but not limited to, road conditions (e.g., potholes, standing water, turns, bridges, narrow lanes, darkness, etc.), a time of day, weather conditions (e.g., rain, fog, wind, storms, an angle of sunshine, etc.), environmental hazards (e.g., debris in the road, a threat of debris falling into the roadway, smoke from a nearby fire, etc.), a particular human condition, and/or other people within the vehicle (e.g., a number of people in the vehicle, a noise level within the vehicle, a number of children being present, etc.), traffic flow, one or more traffic patterns, a traffic amount (e.g., heavy traffic), a time of day (e.g., night driving, rush hour, etc.), an event that may have an effect on traffic congestion (e.g., a concert, a sporting event, a political rally, etc.), pedestrian traffic (e.g., e.g., a crosswalk, a school zone, etc.), and the like. In some cases, the information may be gathered in near real-time, at time intervals during a trip, before a trip, after a trip, or the like.

When information is gathered during a trip, either in near-real time, or at time intervals, the information may be collected via one or more input devices that may include a voice-based application or a button easily (and safely) accessible to the driver or other occupant. For example, a driver may speak a key word (e.g., "high", "low", etc.) or press a button to indicate a current frustration level. In some cases, the information is entered as a binary entry. For example, the driver is or is not experiencing frustration. In other cases, the driver may be able to indicate a level of frustration when providing the information. For example, the driver may be prompted at the conclusion of the trip to enter additional information about any route segments in which the driver has experienced frustration. In other cases, the user input device may be capable of providing the additional information at the time of entry. For example, the user input device may not only be capable of detecting a time at which the driver indicates the feeling of frustration, but also sense a level of frustration at the time, such as by logging a vehicle speed and location information that may be used to identify a road classification type.

In some cases, one or more sensors may optionally be used (e.g., biometric sensors, pressure sensors, microphones, etc.) to generate a signal representative of a driver's feeling of frustration, without the driver consciously providing the information. For example, one or more biometric sensors may be used to sense an increase in a heart rate, breathing rate, and/or the like. In other cases, a pressure sensor may be embedded within the steering wheel of the vehicle and configured for sensing a grip pressure. Such examples illustrative and are not to limit the sensor type or location to the enumerated examples.

In some cases, the one or more mathematical algorithms may be personalized based on information corresponding to a particular driver. For example, the mathematical algorithm may include one or more weighting variables that may be adjusted based on a particular driver's profile, driving history, historical road frustration index values, and/or the like. In an illustrative example, an algorithm may utilize a linear relationship between the vehicle travelling at a percentage of rated speed and the determined level of frustration for a particular driver on a particular road segment or road classification type when determining a value for one or more weighting variables.

In some cases, a personalized mathematical algorithm may be generated for each driver or group of drivers (e.g., student drivers, drivers within a specified age range, etc.). For example, an algorithm may include one or more weighting factors that may be adjusted based on characteristics of a particular driver or group. By using personalized algorithms, the same road segment may have a different road frustration index values based on the personalized weighting factors for each driver. In an illustrative example, an algorithm for scoring a particular road segment may include one or more weighting factors associated with different traffic loadings that may be encountered over a day on the particular road segment. For example, the road segment may be known to experience heavy traffic loading during particular times of day (e.g., rush hour, sporting event start or end times, etc.), where a first driver may be expecting heavier traffic, therefore an associated weighting factor may be used to provide a low weighting (e.g., 0.1, 0.2, etc.) at these times of day. However, a second person (e.g., an inexperienced driver) may have a greater sense of frustration when caught in rush hour traffic, so that the weighting factor may cause this traffic loading time to have an increased weight (e.g., 0.6, 0.7, etc.) in the calculation of the road frustration index. By customizing or personalizing the mathematical algorithm, the resulting road frustration index value will be a more accurate predictor of how much risk may be caused due to a level of frustration being experienced along a particular road segment by a particular driver, or other drivers on the road at the same time.

In an illustrative example, the mathematical algorithm customized for the first driver may predict that the first driver will experience lower frustration (e.g., a road frustration index value of 2, 3, etc.) based on expected rush hour traffic, while the mathematical algorithm customized for the second driver may predict that the second driver will experience a higher level of frustration with rush hour traffic along the same road segment. (e.g., a subjective risk score of 6, 7, etc.). In some cases, the mathematical algorithm and/or the weighting factors used in the mathematical algorithm may be updated for the particular driver upon entry of new information in near real-time, at a defined interval, upon a driver profile update, when an application is started or stopped and/or the like. In some cases, the mathematical model may be substantially similar for all drivers, such as by using a mathematical model based on results of studies performed to measure actual frustration experienced on different road types as compared to a ratio of vehicle speed to the posted speed limit.

In some cases, a risk map including a road frustration index value associated with one or more route segments may be used to generate educational and/or training routes to assist drivers in improving one or more aspects of their driving. While all drivers may benefit from such training routes, student drivers and/or newly licensed drivers may benefit the most. For example, the route frustration index information may be used to determine routes (e.g., a plurality of route segments) that allow drivers to identify traffic and/or road conditions that may cause frustration in themselves and/or in drivers near their vehicle, so that the drivers can recognize these situations so that the driver can recognize risk exposure and/or risky behaviors that may result from actions taken by a frustrated driver. Each driver may generate a custom route based on a personalized mathematical algorithm and/or a frustration risk profile. The driver may then be moved to other types of roads on which they need experience. In such cases, the road frustration index information may be used, not only to minimize risk, but rather to generate routes that give a very slight frustration, to allow a driver to practice and become more comfortable with such situations.

In some cases, when a driver experiences a lack of unease or frustration for too long, even in safe driving conditions (e.g., a route segment with a low objective risk score), the driver may engage in riskier behavior because he/she may lose focus on the road. In such cases, a route may be generated where, rather than minimizing frustration, a route may be generated where the route segments may average to a specified level of frustration along the entire route and/or may include at least some route segments with some level of elevated frustration. In some cases, such a route may actually be safer because it allows the driver to become more focused than the drivers that are driving a route with a little to no level of frustration. In some cases, a route may be generated such that the route segments may alternate between periods of some frustration (e.g., medium frustration, low frustration, etc.) and periods of minimal or no subjective risk. In some cases, such a route may ultimately result in being the safest route. As such, the customizable algorithms may be used to determine that frustration levels may not need to be minimized over an entire route to maximize safety, and that there may even be a target frustration level (e.g., an average frustration index value of 1, 2, 3, etc.) that maximizes safety for each driver. In some cases, the target frustration index value may be a set target for all drivers, a group of drivers, or may be customizable for each individual driver.

In some cases, the one or more algorithms may each utilize a different relationship based on an equation or an exponential relationship between a sensed vehicle speed and the determined level of frustration. In some cases, a personalized algorithm may utilize one or more thresholds to indicate a level of frustration, where a speed below a threshold may indicate a lesser level of frustration and a pressure above the threshold may indicate a higher level of frustration, based on a road type being traveled and/or a time of day of the trip. In some cases, other parameters may be used instead of, or in addition to, vehicle speed, such as a time duration during which a speed level was reduced, where the length of time may be analyzed to determine a level of frustration. In many cases, the frustration index values identified for different road segments may be aggregated over a population of drivers (e.g., all drivers, drivers with similar characteristics, etc.) to determine a level of frustration that may be associated with the different road segments. Such information may be used to predict a frustration level value that may be experienced on route or route segment upon which a driver may travel. In some cases, historical traffic information may be used to provide a speed indication that may be experienced at different times of the day based on the historical traffic patterns. In some cases, historical weather information and/or weather forecast information may be used to identify one or more different weather conditions (e.g., wind, snow, rain, etc.) that may have an effect on traffic speeds, and thus may have an effect when calculating predicted and/or near real time road frustration index values on a particular road segment.

A frustration risk analysis system may receive information via a network from one or more drivers (or vehicles) and analyze the road frustration index information (e.g., speed, time of day, road classification information, etc.) to determine a road frustration index value associated with each driver based on a mathematical algorithm. In some cases, the road frustration index information may be used as inputs to the mathematical algorithm and/or used to modify the algorithm itself so that the mathematical algorithm may be customized for each driver. By using such a customizable algorithm, the road frustration index value may be personalized for individual drivers such as by using personalized weighting factors for different road segments, geographical areas, road times, and the like. This road frustration index value may be representative of types and levels of experiences that the driver may encounter upon a route before experiencing a level of frustration. In some cases, this road frustration index value may be representative of types and/or levels of risks a driver may take when certain frustration index thresholds are met. For example, a driver experiencing a high level of frustration, such as an extended period of time of low speed movement on a particular road type (e.g., a divided highway), may decide to make one or more risky actions, such as swerving across lanes of traffic to exit the highway, shoulder riding behavior, taking an unauthorized U-turn in an authorized vehicle only lane, and the like. The likelihood of the driver taking such risks may become greater as the level of frustration increases, particularly when the frustration is experienced over an extended period of time.

Further, the frustration index values may be used to represent that at least a portion (e.g., a specified percentage) of a route upon which a particular driver may experience a minimum (or maximum) of frustration. The frustration index value may also be used to represent a pattern of risk across a plurality of route segments of a route, where a transition between a route segment having a low road frustration index value and a route segment having a higher road frustration index value may be made more gradual to avoid a quick transition between road frustration index levels. In such cases, a route provided to a driver may have a road frustration index value for the complete route having a higher overall risk than a different route that may include a quick transition between route segments with low road frustration index values and high road frustration index values. These road frustration index values, along with any identified risks for which the driver may experience along the route, may be used to determine a road frustration index map and/or one or more routes for the driver to follow to minimize an amount of driving frustration experienced by the driver during a trip.

In some cases, the road frustration index value may be combined with one or more other scores related to a risk that may be identified from the route, such as an objective risk score, a subjective risk score, etc. The resulting combined risk score may be output by the computing device as an "overall" risk score. In some cases, one or more road frustration index values may be used to supplement an objective risk score, a subjective risk score and the like. In some cases, the objective risk score and/or a subjective risk score may be used to supplement a calculated road frustration index value. For example, the subjective risk identified for a route may correspond to one or more road characteristics, such as a case where a person may experience a greater level of frustration in a road segment having elevated traffic loading near a blind left-hand turn. An objective risk map having a representation of an objective risk score for a particular road segment may show an indication that a greater number of accidents may occur along the road segment having a blind left-hand turn, however a subjective risk may be reduced for that particular driver as the subjective risk score may predict that the driver may be more alert when approaching that particular road segment. In some cases, the road frustration index value may indicate that the same driver may be more likely to engage in a risky turn at the blind left-hand turn when their road frustration index value is high.

In some cases, rather than simply minimizing risk, a road frustration index value may be calculated to provide a desired level of frustration for a route, such as at a level (e.g., about 1, about 2) to keep a driver alert and/or attentive. In an illustrative example, a road frustration index value may be specified and used to generate a route having a road frustration index average corresponding to an "optimal" level of frustration such that the driver remains alert, but not particularly uncomfortable. In some cases, this optimal level of risk may be customized for each individual driver. For example, the road frustration index values determined for a particular driver may be compared to a threshold and/or an average of road frustration index values of similar drivers (e.g., similar in age, experience, demographics, etc.) for different road classification types, types of road hazards (e.g., an unprotected left turn, road geometry, landscape features, etc.) and/or conditions (e.g., rain, snow, wind, etc.).

For example, this information may be analyzed using one or more mathematical algorithms to determine a location and/or a likelihood that a subjective risk may exist along a route. The road frustration risk analysis system may further incorporate objective risks (e.g., construction areas, wildlife areas, accident prone areas, dangerous intersections, etc.) and/or subjective risks (e.g., blind left-hand turns, bridges, etc.) when generating a map and/or routes for presentation to the driver. Such information may be overlaid on a map and indicate such risks based on a particular driver, or a particular grouping of drivers. Drivers may be grouped by any combination of age, relative driving experience, a driver license type (e.g., passenger, commercial, etc.), a number of passengers within the vehicle, a preference of route types (e.g., a fastest route, a route avoiding major roadways, etc.) and/or the like. In some cases, the drivers may be grouped based on one or more road frustration index values that may be stored as a portion of a profile for each driver. For example, one or more groups of drivers may be formed based on the drivers having similar frustration index values across a variety of situations that may be encountered along a route or by having similar risk profiles.

In some cases, a business organization, such as an insurance company, may utilize the information gathered on road frustration index values experienced on a route, a subjective risk map, an objective risk map and the like to determine where the different maps are aligned or are different. In some cases, the insurance company may analyze the information to determine which drivers may experience a lower level of frustration or a higher level of frustration as compared to the total population of drivers. In such cases, the business organization may use this information to inform business rules and/or policies. For example, an insurance company may incorporate such information regarding road frustration index values, subjective risks and/or objective risks into an overall risk score for a particular driver. In some cases, the overall risk score may be used to identify educational materials or provide tools that may be used in providing training for a driver so to avoid participating in risky driving (e.g., cutting other drivers off, short stopping, hard braking, hard cornering, unauthorized lane change, unauthorized U-turns, etc.) when the driver is experiencing elevated levels of frustration.

In some cases, in accordance with aspects of this disclosure, one or more of a personal navigation device, a vehicle, a mobile device, and/or a personal computing device may access a database of risk values associated with stored historical road frustration index values to assist in identifying and presenting alternate low-risk travel routes. The driver may select among the various travel routes presented, taking into account his/her tolerance for risk. In some cases, a particular route may be suggested as being the route with the lowest associated predicted and/or historical frustration levels. In some cases, the personal navigation device, the computing system of a vehicle, the mobile device and/or the personal computing device may be used to obtain an objective risk score associated with one or more routes and/or alternate routes. In some cases, the predicted and/or near-real time road frustration index values may be used to generate an insurance premium and/or an incentive corresponding to insurance coverage for a driver based on a road frustration index values associated with a route traveled in the vehicle.

FIG. 1A illustrates a block diagram of a computing device (or system) 101 (e.g., a road frustration index calculator) in a computer system 100 (e.g., frustration level mapping and mitigation computing system) that may be used according to one or more illustrative embodiments of the disclosure. The computing device 101 may have a processor 103 for controlling overall operation of the computing device 101 and its associated components, including one or more memory units (e.g., RAM 105, ROM 107), an input/output module 109, and a memory 115. The computing device 101, along with one or more additional devices (e.g., terminals 141 and 151, security and integration hardware 160) may correspond to any of multiple systems or devices, such as a subjective risk analysis system and/or an input device configured as described herein for determining a level of subjective risk experienced by a driver for a particular road segment, determining an overall level of risk associated with different road segments, determining a subjective risk tolerance for a driver, or grouping of drivers, generating a subjective risk map identifying road segments having some level of associated subjective risk, and/or generating one or more routes for a driver, or group of drivers based on a desired level of subjective risk exposure. In some cases, the level of subjective risk determined for a route may be combined with a level of objective risk calculated for the route to determine a combined objective/subjective risk score for the route.

The input/output (I/O) 109 may include one or more user interfaces, such as a microphone, a keypad, one or more buttons, one or more switches, a touch screen, a stylus, one or more pressure sensors, one or more biometric sensors, and/or one or more other sensors (e.g., an accelerometer, a gyroscope, etc.) through which a user of the computing device 101 may provide input, and may also include one or more of a speaker for providing audio output and a video display device for providing textual, audiovisual and/or graphical output. Software may be stored within memory 115 and/or storage to provide instructions to processor 103 for enabling device 101 to perform various actions. For example, memory 115 may store software used by the device 101, such as an operating system 117, application programs 119, and an associated internal database 121. The various hardware memory units in memory 115 may include volatile and nonvolatile, removable and non-removable media implemented in any method or technology for storage of information such as computer readable instructions, data structures, program modules or other data. The memory 115 also may include one or more physical persistent memory devices and/or one or more non-persistent memory devices. The memory 115 may include, but is not limited to, random access memory (RAM) 105, read only memory (ROM) 107, electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by processor 103.

The processor 103 may include a single central processing unit (CPU), which may be a single-core or multi-core processor (e.g., dual-core, quad-core, etc.), or may include multiple CPUs. In some cases, the processor 103 may have various bit sizes (e.g., 16-bit, 32-bit, 64-bit, 96-bit, 128-bit, etc.) and various processor speeds (ranging from 100 MHz to 5 Ghz or faster). The processor 103 and its associated components may allow the system 101 to execute a series of computer-readable instructions, for example, to determine a road frustration index value associated with one or more of a plurality of road segments and/or to determine a user's tolerance for driving-related frustrations experienced while traveling along a route. In some cases, the instructions may be configured to cause the processor 103 to determine one or more routes for a user to travel based, at least in part, on the user's tolerance for road frustration that may occur along the route. In other cases, the instructions may be configured to cause the processor 103 to determine, using aggregated road frustration index information obtained from a plurality of users, a risk map, where road frustration index values may be overlaid over the map to show areas where drivers experience frustration, and/or other risks, while travelling along a route.

The computing device 101 (e.g., a customer terminal, an insurance provider computer hardware memory and processor system, an insurance clearinghouse computer memory and processor device, etc.) may operate in a networked environment 100 supporting connections to one or more remote computers, such as terminals 141 and 151. The terminals 141 and 151 may be personal computers, servers (e.g., web servers, database servers), or mobile communication devices (e.g., mobile phones, portable computing devices, vehicles, and the like), and may include some or all of the elements described above with respect to the computing device 101. In some cases, the terminals 141, 151 may be located at one or more different geographic locations, including, but not limited to, at a customer location, a site associated with an insurance agent and/or agency and/or a site associated with an insurance provider. The network connections depicted in FIG. 1A include a local area network (LAN) 125 and a wide area network (WAN) 129, and a wireless telecommunications network 133, but may also include other networks. When used in a LAN networking environment, the computing device 101 may be connected to the LAN 125 through a network interface or adapter 123. When used in a WAN networking environment, the device 101 may include a modem 127 or other means for establishing communications over the WAN 129, such as network 131 (e.g., the Internet, a cellular network, and the like). When used in a wireless telecommunications network 133, the device 101 may include one or more transceivers, digital signal processors, and additional circuitry and software for communicating with wireless computing devices 141 (e.g., mobile phones, portable customer computing devices) via one or more network devices 135 (e.g., base transceiver stations) in the wireless network 133.

Also illustrated in FIG. 1A is a security and integration layer 160, through which communications may be sent and managed between the computing device 101 and the remote devices (141 and 151) and remote networks (125, 129, and 133). The security and integration layer 160 may comprise one or more computing devices, such as web servers, authentication servers, and various networking components (e.g., firewalls, routers, gateways, load balancers, etc.), having some or all of the elements described above with respect to the computing device 101. As an example, security and integration layer 160 may comprise a set of web application servers configured to use secure protocols and to insulate the computing device 101 (e.g., one or more servers, a workstation, etc.) from external devices 141 and 151. In some cases, the security and integration layer 160 may correspond to a set of dedicated hardware and/or software operating at the same physical location and under the control of same entities as the computing device 101. For example, the layer 160 may correspond to one or more dedicated web servers and network hardware in a data center or in a cloud infrastructure supporting a cloud-based application and/or process. In other examples, the security and integration layer 160 may correspond to separate hardware and software components which may be operated at a separate physical location and/or by a separate entity.

In some cases, the data transferred to and from computing device 101 in may include secure and sensitive data, such as historical vehicle location information, real-time vehicle location and/or status information, insurance customer and policy data, etc. Therefore, it may be desirable to protect the data transmission by using secure network protocols and encryption, and also to protect the integrity of the data stored when on the computing device 101 using the security and integration layer 160 to authenticate users and restrict access to unknown or unauthorized users. In various implementations, security and integration layer 160 may provide, for example, a file-based integration scheme or a service-based integration scheme. In file-based integration, data files may be transmitted to and from the computing device 101 through the security and integration layer 160, using various network communication protocols. Secure data transmission protocols and/or encryption may be used in file transfers to protect to integrity of the data, for example, File Transfer Protocol (FTP), Secure File Transfer Protocol (SFTP), and/or Pretty Good Privacy (PGP) encryption.

In service-based integration, one or more web services may be implemented within the system 100 between the computing device 101 and/or security and integration layer 160. The web services may be accessed by authorized external devices and users to support input, extraction, and manipulation of the data in the computing device 101. Web services built to support the system 100 may be cross-domain and/or cross-platform, and may be built for enterprise use. Such web services may be developed in accordance with various web service standards, such as the Web Service Interoperability (WS-I) guidelines. In some examples, system web service may be implemented in the security and integration layer 160 using the Secure Sockets Layer (SSL) or Transport Layer Security (TLS) protocol to provide secure connections between the computing device 101 and various clients 141 and 151 attempting to access, insert and/or manipulate data within the system 100. SSL or TLS may use HTTP or HTTPS to provide authentication and/or confidentiality. In some cases, system web service may be implemented using the WS-Security standard, which provides for secure SOAP messages using XML encryption. In still other examples, the security and integration layer 160 may include specialized hardware for providing secure web services. For example, secure network appliances in the security and integration layer 160 may include built-in features such as hardware-accelerated SSL and HTTPS, WS-Security, and firewalls. Such specialized hardware may be installed and configured in the security and integration layer 160 in front of the web servers, so that any external devices may communicate directly with the specialized hardware.

Although not shown in FIG. 1A, various elements within the memory 115 or other components in the system 100, may include one or more caches, for example, CPU caches used by the processing unit 103, page caches used by the operating system 117, disk caches of a hard drive, and/or database caches used to cache content from database 121. For embodiments including a CPU cache, the CPU cache may be used by one or more processors in the processing unit 103 to reduce memory latency and access time. In such examples, a processor 103 may retrieve data from or write data to the CPU cache rather than reading/writing to memory 115, which may improve the speed of these operations. In some examples, a database cache may be created in which certain data from a database 121 may be cached in one or more separate smaller databases on an application server separate from the database server. For instance, in a multi-tiered application, a database cache on an application server can reduce data retrieval and data manipulation time by not needing to communicate over a network with a back-end database server. These types of caches and others may be included in various embodiments, and may provide potential advantages in certain implementations of the system 100.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, Wi-Fi, Bluetooth, WiMAX, etc., is presumed, and the various computer devices and insurance clearinghouse system components described herein may be configured to communicate using any of these network protocols or technologies.

Additionally, one or more application programs 119, such as a road frustration index determination application, may be used by one or more computing devices (e.g., the computing device 101) within the system 100, including computer executable instructions for identifying a road frustration index being experienced by a driver (or owner, passenger, parent of the driver, etc.) of a vehicle in near-real time, predicting one or more road segments upon which the driver may experience some level of road frustration, generating a road frustration index value associated with the driver corresponding to a driving speed on a road segment having an associated road classification type, and generating one or more travel routes each predicted to have an associated road frustration index value based on information received from a plurality of drivers.

Figure 1B:
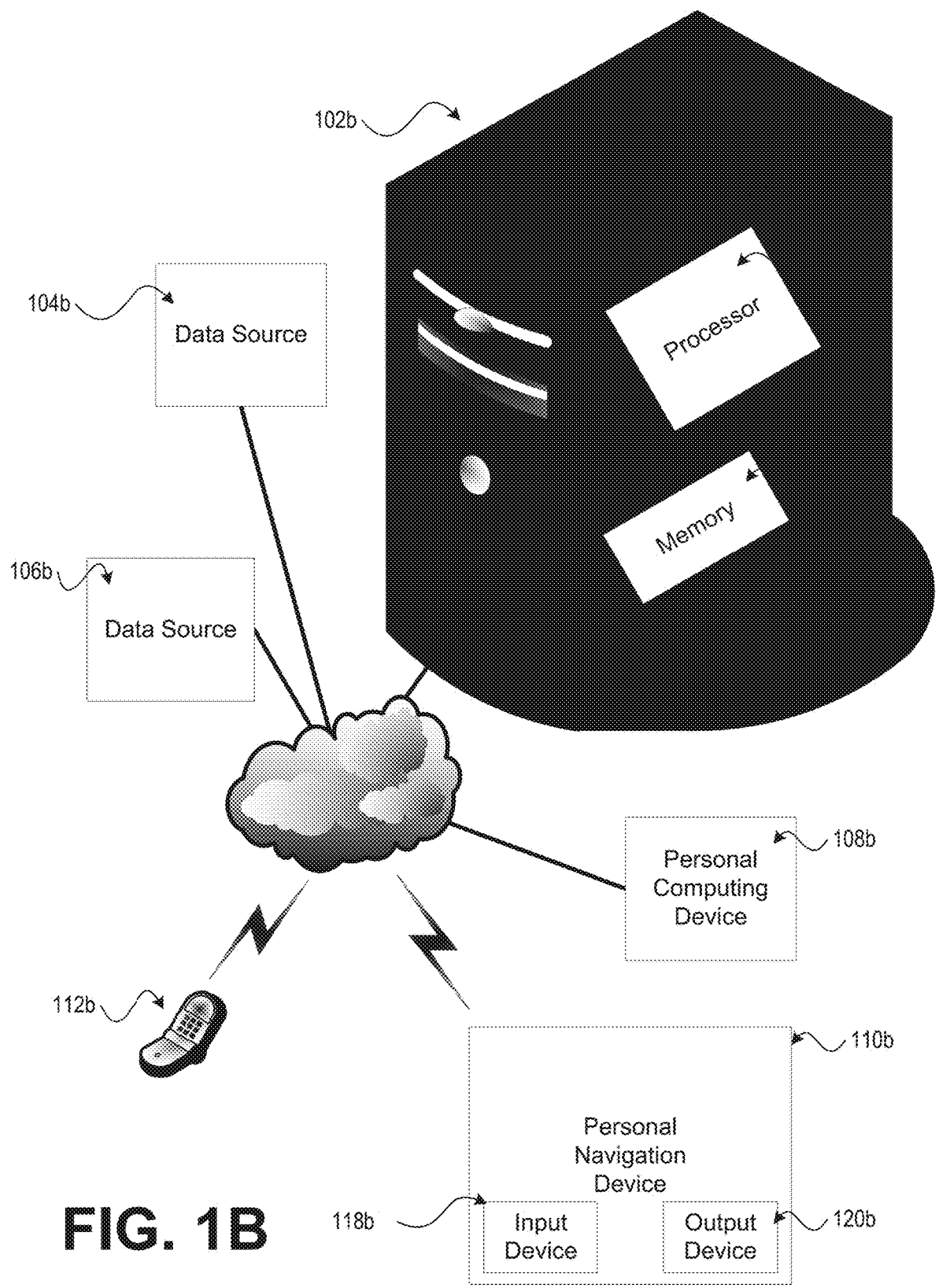

Referring to FIG. 1B, an example of a suitable operating environment in which various aspects of this disclosure may be implemented is shown in the architectural diagram of FIG. 1B. The operating environment is only one example of a suitable operating environment and is not intended to suggest any limitation as to the scope of use or functionality of this disclosure. The operating environment may be comprised of one or more data sources 104b, 106b in communication with a computing device 102b. The computing device 102b may use information communicated from the data sources 104b, 106b to generate values that may be stored in a conventional database format. In one embodiment, the computing device 102b may be a high-end server computer with one or more processors 114b and memory 116b for storing and maintaining the values generated. The memory 116*b* storing and maintaining the values generated need not be physically located in the computing device 102*b*. Rather, the memory (e.g., ROM, flash memory, hard drive memory, RAID memory, etc.) may be located in a remote data store (e.g., memory storage area) physically located outside the computing device 102*b*, but in communication with the computing device 102*b*.

A personal computing device 108*b* (e.g., a personal computer, tablet PC, handheld computing device, personal digital assistant, mobile device, etc.) may communicate with the computing device 102*b*. Similarly, a personal navigation device 110*b* (e.g., a global positioning system (GPS), geographic information system (GIS), satellite navigation system, mobile device, other location tracking device, etc.) may communicate with the computing device 102*b*. The communication between the computing device 102*b* and the other devices 108*b*, 110*b* may be through wired or wireless communication networks and/or direct links. One or more networks may be in the form of a local area network (LAN) that has one or more of the well-known LAN topologies and may use a variety of different protocols, such as Ethernet. One or more of the networks may be in the form of a wide area network (WAN), such as the Internet. The computing device 102*b* and other devices (e.g., devices 108*b*, 110*b*) may be connected to one or more of the networks via twisted pair wires, coaxial cable, fiber optics, radio waves or other media. The term "network" as used herein and depicted in the drawings should be broadly interpreted to include not only systems in which devices and/or data sources are coupled together via one or more communication paths, but also stand-alone devices that may be coupled, from time to time, to such systems that have storage capability.

In an illustrative example in accordance with aspects of this disclosure, a personal navigation device 110*b* may operate in a stand-alone manner by locally storing some of the database of values stored in the memory 116*b* of the computing device 102*b*. For example, a personal navigation device 110*b* (e.g., a GPS in an automobile) may be comprised of a processor, memory, and/or input devices 118*b* and/or output devices 120*b* (e.g., keypad, display screen, speaker, etc.). The memory may be comprised of a non-volatile memory that stores a database of values used in calculating an estimated route risk for identified routes. Therefore, the personal navigation device 110*b* need not communicate with a computing device 102*b* located at, for example, a remote location in order to calculate identified routes. Rather, the personal navigation device 110*b* may behave in a stand-alone manner and use its processor to calculate route risk values (e.g., a road frustration index value and/or a travel time delay value, etc.) associated with one or more identified routes. If desired, the personal navigation device 110*b* may be updated with an updated database of values after a period of time (e.g., an annual patch with new risk values determined over the prior year).

In yet another embodiment in accordance with aspects of this disclosure, a personal computing device 108*b* may operate in a stand-alone manner by locally storing some of the database of values stored in the memory 116*b* of the computing device 102*b*. For example, a personal computing device 108*b* may be comprised of a processor, memory, input device (e.g., keypad, CD-ROM drive, DVD drive, etc.), and output device (e.g., display screen, printer, speaker, etc.). The memory may be comprised of CD-ROM media that stores values used in calculating an estimated route risk for an identified route. Therefore, the personal computing device 108*b* may use the input device to read the contents of the CD-ROM media in order to calculate a value for the identified route. Rather, the personal computing device 10*b*8 may behave in a stand-alone manner and use its processor to calculate a route risk value. If desired, the personal computing device 108*b* may be provided with an updated database of values (e.g., in the form of updated CD-ROM media) after a period of time. One skilled in the art will appreciate that personal computing device 108*b*, 110*b*, 112*b* need not be personal to a single user; rather, they may be shared among members of a family, company, etc.

The data sources 104*b*, 106*b* may provide information to the computing device 102*b*. In one embodiment in accordance with aspects of this disclosure, a data source may be a computer which contains memory storing data and is configured to provide information to the computing device 102*b*. Some examples of providers of data sources in accordance with aspects of this disclosure include, but are not limited to, insurance companies, third-party insurance data providers, government entities, state highway patrol departments, local law enforcement agencies, state departments of transportation, federal transportation agencies, traffic information services, road hazard information sources, construction information sources, weather information services, geographic information services, vehicle manufacturers, vehicle safety organizations, and environmental information services. For privacy protection reasons, in some embodiments of this disclosure, access to the information in the data sources 104*b*, 106*b* may be restricted to only authorized computing devices 102*b* and for only permissible purposes. For example, access to the data sources 104*b*, 106*b* may be restricted to only those persons/entities that have signed an agreement (e.g., an electronic agreement) acknowledging their responsibilities with regard to the use and security to be accorded this information.

The computing device 102*b* uses the information from the data sources 104*b*, 106*b* to generate values that may be used to calculate an estimated route risk. Some examples of the information that the data sources 104*b*, 106*b* may provide to the computing device 102*b* include, but are not limited to, accident information, geographic information, and other types of information useful in generating a database of values for calculating an estimated route risk. For example, a driver may have knowledge that accidents may be more common along a particular stretch of a roadway or type of road segment and may experience an increased level of unease as they travel, or approach, a particular road segment.

Some examples of accident information include, but are not limited to, loss type, applicable insurance coverage(s) (e.g., bodily injury, property damage, medical/personal injury protection, collision, comprehensive, rental reimbursement, towing), loss cost, number of distinct accidents for the segment, time relevancy validation, cause of loss (e.g., turned left into oncoming traffic, ran through red light, rear-ended while attempting to stop, rear-ended while changing lanes, sideswiped during normal driving, sideswiped while changing lanes, accident caused by tire failure (e.g., blow-out), accident caused by other malfunction of car, rolled over, caught on fire or exploded, immersed into a body of water or liquid, unknown, etc.), impact type (e.g., collision with another automobile, collision with cyclist, collision with pedestrian, collision with animal, collision with parked car, etc.), drugs or alcohol involved, pedestrian involved, wildlife involved, type of wildlife involved, speed of vehicle at time of incident, direction the vehicle is traveling immediately before the incident occurred, date of incident, time of day, night/day indicator (i.e., whether it was night or day at the time of the incident), temperature at time of incident, weather conditions at time of incident (e.g., sunny, downpour rain, light rain, snow, fog, ice, sleet, hail, wind, hurricane, etc.), road conditions at time of incident (e.g., wet pavement, dry pavement, etc.), and location (e.g., geographic coordinates, closest address, zip code, etc.) of vehicle at time of incident.

Accident information associated with vehicle accidents may be stored in a database format and may be compiled per segment. One skilled in the art will understand that the term segment may be interchangeably used to describe a road segment, intersection, round about, bridge, tunnel, ramp, parking lot, railroad crossing, or other feature that a vehicle may encounter along a route.

Time relevancy validation relates to the relevancy of historical accident information associated with a particular location. Time relevancy validation information may be dynamically created by comparing the time frames of accident information to the current date. For example, if a location or route had many collisions prior to five years ago but few since, perhaps a road improvement reduced the risk (such as adding a traffic light). Time relevancy information may be generated remotely and transmitted by a data source 104, 106 to the computing device 102 like other information. Alternatively, time relevancy information may be calculated at the computing device 102 using other information transmitted by a data source 104, 106. In some cases, time relevancy information may be calculated at the computing device without reference to data communicated from the data source 104, 106. For example, the appropriateness of historical information may be related to the time frame into which the information belongs. Examples of time frames may include, but are not limited to, less than 1 year ago, 1 year ago, 2 years ago, 3 years ago, 4 years ago, 5 to 10 years ago, and greater than 10 years ago. In one embodiment, the more recent the historical information, the greater weight is attributed to the information.

Some examples of geographic information include, but are not limited to, location information and attribute information. Examples of attribute information include, but are not limited to, information about characteristics of a corresponding location described by some location information: posted speed limit, construction area indicator (i.e., whether location has construction), topography type (e.g., flat, rolling hills, steep hills, etc.), road type (e.g., residential, interstate, 4-lane separated highway, city street, country road, parking lot, etc.), road feature (e.g., intersection, gentle curve, blind curve, bridge, tunnel), number of intersections, whether a roundabout is present, number of railroad crossings, whether a passing zone is present, whether a merge is present, number of lanes, width of road/lanes, population density, condition of road (e.g., new, worn, severely damaged with sink-holes, severely damaged with erosion, gravel, dirt, paved, etc.), wildlife area, state, county, and/or municipality. Geographic information may also include other attribute information about road segments, intersections, bridges, tunnels, railroad crossings, and other roadway features.

Location information for an intersection may include the latitude and longitude (e.g., geographic coordinates) of the geometric center of the intersection. The location may be described in other embodiments using a closest address to the actual desired location or intersection. The intersection (i.e., location information) may also include information that describes the geographic boundaries, for example, of the intersection which includes all information that is associated within a circular area defined by the coordinates of the center of the intersection and points within a specified radius of the center. In another example of location information, a road segment may be defined by the latitude and longitude of its endpoints and/or an area defined by the road shape and a predetermined offset that forms a polygon. Segments may comprise intersections, bridges, tunnels, rail road crossings or other roadway types and features. Those skilled in the art will recognize that segments can be defined in many ways without departing from the spirit of this disclosed invention.

Some examples of vehicle information include, but are not limited to, information that describes vehicles that are associated with incidents (e.g., vehicle accidents, etc.) at a particular location (e.g., a location corresponding to location information describing a segment, intersection, etc.) Vehicle information may include vehicle make, vehicle model, vehicle year, and age. Vehicle information may also include information collected through one or more in-vehicle devices or systems such as an event data recorder (EDR), onboard diagnostic system, or global positioning satellite (GPS) device; examples of this information include speed at impact, brakes applied, throttle position, direction at impact. As is clear from the preceding examples, vehicle information may also include information about the driver of a vehicle being driven at the time of an incident. Other examples of driver information may include age, gender, marital status, occupation, alcohol level in blood, credit score, distance from home, cell phone usage (i.e., whether the driver was using a cell phone at the time of the incident), number of occupants.

In one embodiment in accordance with aspects of this disclosure, a data source 104b may provide the computing device 102b with accident information that is used to generate values (e.g., create new values and/or update existing values). The computing device 102b may use at least part of the received accident information to calculate a value, associate the value with a road segment (or other location information), and store the value in a database format. One skilled in the art will appreciate, after thorough review of the entirety disclosed herein, that there may be other types of information that may be useful in generating a database of values for use in, among other things, calculating an estimated route risk.

For example, in accordance with aspects of this disclosure, a data source 104b may provide the computing device 102b with geographic information that is used to generate new roadway feature risk values in a database of risk values and/or update existing risk values; where the roadway feature may comprise intersections, road segments, tunnels, bridges, or railroad crossings. Attributes associated with roadways may also be used in part to generate risk values. The computing device 102b may use at least part of the received geographic information to calculate a value, associate the value with a road segment (or other location information), and store the value in a database format. Numerous examples of geographic information were provided above. For example, a computing device 102b may receive geographic information corresponding to a road segment comprising accident information and roadway feature information and then calculate a risk value. Therefore, when calculating a risk value, the system may use, in one example, the geographic information and the accident information (if any accident information is provided). In alternative embodiments in accordance with aspects of this disclosure, the computing device may use accident information, geographic information, vehicle information, and/or other information, either alone or in combination, in calculating risk values in a database format.

The values generated by the computing device 102b may be associated with a road segment containing the accident location and stored in a data store. Similar to a point of interest (POI) stored in GPS systems, a point of risk (POR) is a road segment or point on a map that has risk information (e.g., subjective risk, objective risk, risk of road frustration being experienced by a driver, etc.) associated with it. Points of risk may arise because incidents (e.g., accidents) have occurred at these points before. In accordance with aspects of this disclosure, the road segment may be a predetermined length (e.g., ¼ mile) on a stretch of road. Alternatively, road segments may be points (i.e., where the predetermined length is minimal) on a road. Furthermore, in some embodiments, road segment may include one or more different roads that are no farther than a predetermined radius from a road segment identifier. Such an embodiment may be beneficial in a location, for example, where an unusually large number of streets intersect, and it may be impractical to designate a single road for a road segment.

Figure 2:
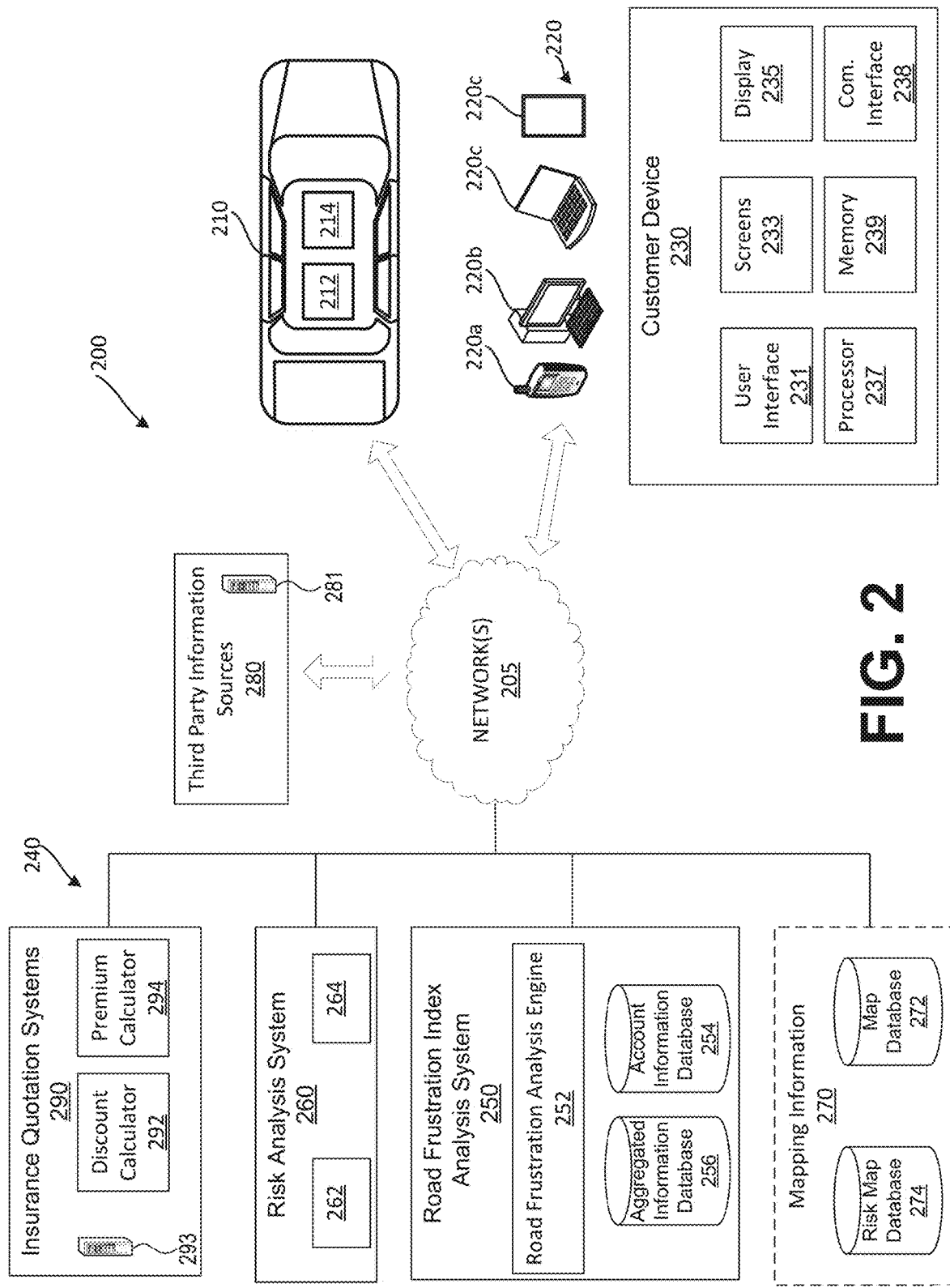
FIG. 2 shows an illustrative operating environment in accordance with aspects of this disclosure.

FIG. 2 shows an illustrative block diagram of a system 200 for generating and using road frustration index information, such as by generating one or more road frustration index maps that may be used by one or more users in accordance with aspects of this disclosure. The system may include a vehicle 210, one or more user devices 220 associated with a user (e.g., a driver, etc.) of the vehicle, and a remote computing system 240 that may be associated with a business entity (e.g., an insurance provider, a vehicle manufacturer, a global positioning company, etc.) or governmental agency having an interest in assessing and/or minimizing a level of frustration being experienced by a driver when travelling on one or more segments of road upon which the user travels within the vehicle. The one or more user devices 220 may include a variety of personal computing devices including, but not limited to, a phone (e.g., a smart phone 220a), a personal computer 220b, a laptop computer 220c, a tablet computer 220d, a personal navigation device 110b, a vehicle's computer system, and/or the like. In some cases, the user devices 220 may comprise the illustrative user device 230 that may include a user interface 231 that may be capable of displaying one or more user interface screens 233 on a display device 235. The user interface screens 233 may include screens for displaying information to the user and/or receiving information from the user. The user device 230 may further include a processor 237, one or more memory devices 239 and a communication interface 238. In some cases, one or more of the user interface 231, the user interface screens 233, the display device 235, the processor 237, the one or more memory devices 239, and/or the communication interface 238 may be implemented similarly to the corresponding features discussed in reference to FIGS. 1A and 1B.

In some cases, one or more devices associated with the user and/or vehicle 210 may communicate via one or more wired or wireless networks 205 to the remote computing system 240. For example, the remote computing system 240 may include one or more of a road frustration index analysis system 250, a risk analysis system 260 that may include one or both of an objective risk analysis system and a subjective risk analysis system, and/or an insurance quotation system 290. Illustrative examples of the objective risk analysis system 262 and/or the subjective risk analysis system 262 are discussed in U.S. patent application Ser. No. 15/268,750, filed Sep. 19, 2019, and entitled "Polynomial Route Risk Mitigation," and U.S. patent application Ser. No. 15/013, 523, filed Feb. 2, 2016, and entitled "Subjective Route Risk Mapping and Mitigation," both of the aforementioned are incorporated by reference in their entirety herein.

In an illustrative example, the frustration index analysis system 250 may be configured to identify a level of frustration being experienced by a user and/or predicted to be experience when traveling over one or more route segments for one or more users, such as insurance customers of an insurance company. The frustration index analysis system 250 may utilize demographic information, telematics information, and the like associated with the user, along with frustration information solicited or otherwise received from the user when calculating or predicting the frustration index value. In some cases, the frustration index analysis system 250 may include a frustration index analysis engine 252 configured to generate frustration index information and/or frustration risk maps associated with customers of the business organization. The frustration index analysis engine 252 may utilize information received from one or more remote devices associated with the user (e.g., the vehicle 210, the user interface device 212, the input device 214, and the user devices 220, 230) via the one or more networks. In some cases, the frustration index analysis system 250 may be used to generate and/or store one or more frustration risk maps associated with a group of users (e.g., an age group, a driving experience group, etc.), which may then be used in improving a frustration risk model.

In some cases, the objective risk analysis system 260 may be used identify and/or mitigate one or more objective risks associated with a route that may be traveled by the vehicle 210. For example, the objective risk analysis system 260 may be configured to use geographically encoded information to reward and/or promote risk mitigation of identified objective risks (e.g., an accident, a dangerous road segment, etc.) as discussed in co-pending U.S. patent application Ser. No. 14/100,913, filed Dec. 9, 2013, and entitled "Route Risk Mitigation," which is a continuation of U.S. patent application Ser. No. 12/118,021, filed May 9, 2008, issued Dec. 10, 2013 as U.S. Pat. No. 8,606,512, which claims priority to U.S. Provisional Patent Application No. 60/917,169 filed May 10, 2007. All of the aforementioned are incorporated by reference in their entirety herein.

One or more of the road frustration index analysis system 250, the objective risk analysis system 262 and/or the subjective risk analysis system 264 may access, via the wired or wireless networks 205, information provided by one or more computer systems 281 associated with a plurality of third-party information sources 280. Illustrative examples of third-party data sources may include the one or more data sources 104b, 106b discussed above. Further, one or more devices within the insurance quotation system 290, the third party information sources 280, the mapping information, the objective risk analysis system 260, and/or the subjective risk analysis system 260 may be implemented using computing devices (e.g., the computing device 101, 102a, etc.) discussed in reference to FIGS. 1A and 1B.

The remote computing system 240 may further include one or more databases for storing mapping information 270. In some cases, the mapping information may include geocoded mapping information stored within a map database 272. The geocoded mapping information may include, but not be limited to the location and mapping information discussed above, such as information about characteristics of a corresponding location (e.g., posted speed limit, construction area indicator, topography type, road type, road feature, number of intersections, whether a roundabout is present, number of railroad crossings, whether a passing zone is present, whether a merge is present, number of lanes, width of road/lanes, population density, condition of road, wildlife area, state, county, and/or municipality). The mapping information 270 may also include other attribute information about road segments, intersections, bridges, tunnels, railroad crossings, and other roadway features. The mapping information 270 may further include the address and/or latitude and longitude of noted geographic features and/or the characteristics of the corresponding location.

In an illustrative example, the vehicle 210 may include a user interface 212 and an input device 214 accessible to an occupant of the vehicle. The user interface 212 may include a display and/or speakers for presenting audio and/or video information to the user. For example, the display may be used to present geographic information (e.g., a map, a route, etc.) and/or vehicle information (e.g., temperature information, vehicle speed, tire pressure, radio information, cabin environmental information, etc.) to the user via one or more user interface screens. In some cases, the user interface 212 may present the geographic information and/or the vehicle information as an audio message presented using speakers installed within the vehicle. In some cases, the user interface 212 may include a personal computing device 108b, such as the personal navigation device 110b, a smart phone 220a, a laptop computer 220c, and/or the tablet computer 220d. The personal navigation device 110b may be located, for example, in the vehicle 210 or in a mobile device (e.g., the smart phone 220a, the tablet computer 220d, etc.) with location tracking capabilities. In some cases, the input device 214 may include one or more means for the driver and/or passenger in the vehicle to provide information about how they feel regarding a plurality of road segments or type of road segment (e.g., frustration information). The input device may be configured to provide the frustration information in real-time or near real-time to the remote computing system 240 for processing.

In some cases, the driver and/or passenger in the vehicle 210 may provide frustration information (e.g., using the user interface 212, the input device 214 and/or the user devices 220) regarding how they feel towards a particular road segment or type of road segment (e.g., a low level of frustration, a medium level of frustration, a high level of frustration, etc.) to be processed by the road frustration analysis engine 252 using one or more algorithms to determine a level of frustration associated with the user in near real time and/or a level of frustration predicted to be experienced by the user on one or more particular road segments. For example, a user may experience some level of frustration based on traffic loading being experienced, or knowledge of potential traffic loading along the route, or in a known location. In some cases, the way a person drives and/or acts in a particular driving situation may be influenced by the level of frustration being experienced, along with any objective or subjective risk, present during a time the vehicle is on a particular road segment. In some cases, the road frustration analysis engine 252 may use the frustration information, with or without other information (e.g., subjective risk information, objective risk information, weather information, traffic loading information, time of day information, etc.), to generate frustration index value for the user when traveling an identified road segment. In some cases, a map identifying a level of frustration that may be appreciated, or predicted to be appreciated, by the driver over a travel route. In some cases, the road frustration analysis engine 252 may use the road frustration information, along with the vehicle speed and/or a road segment classification, to generate a route for use by the user in navigating to a desired location. The identified route may identify a predicted road frustration index value, one or more identified subjective risks and/or objective risks that may be appreciated by the driver and/or may be configured to avoid one or more of the road segments associated with a road frustration index value that meets a predetermined criterion, identified subjective risks and/or identified objective risks.

In some cases, the route frustration index calculations may be common to all users, common to a group of users, customized to a particular user, or the like. In an illustrative example, the occupant of the vehicle (e.g., the driver, a passenger, etc.) may provide personal preference information corresponding to an exposure to frustration inducing situations (e.g., route congestion, construction delays, slow drivers, etc.), hazards, or other driving situations, that may be experienced while driving the vehicle along a route. For example, the driver may be presented a questionnaire, either on paper, or electronically via one or more of the personal computing devices 220. The questionnaire may be used to identify a level of risk tolerance towards frustration inducing risks that may be experienced while driving. For example, the questionnaire may prompt the user to identify a preferred driving route, such as whether the driver prefers to take the fastest route, one that avoids major roadways, one that avoids traffic backups, one that avoids unprotected left turns, and/or the like. For example, the questionnaire may prompt the user to give a relative weight (e.g., a ranking, etc.) to one or more identified sources of subjective risks to identify a preferred "trade-off" between a delay time (e.g., minutes spent doing additional driving) versus the driver's perceived comfort or perceived safety along the route (e.g., avoiding unprotected left turns, avoiding bridges, avoiding high-traffic roadways, etc.). The answers provided by the driver may be used in generating the route frustration index values for the particular driver according to one or more customizable mathematical algorithms, such as an algorithm based on weightings associated with each of the answer choices.

In some cases, the people may answer questions regarding different driving situations differently than when the driver experiences similar situations while driving a vehicle. In such cases, the information gathered via the questionnaire may be supplemented, or replaced, by frustration information gathered while driving the vehicle.

In some cases, the road frustration index analysis engine 252 may analyze the frustration risk information entered or otherwise obtained about a particular driver. Using this frustration risk information, a frustration risk profile may be built for each driver where the frustration risk profile includes personalized frustration risk information that may be used to generate a road frustration index value for one or more road segments or types of road segments. The frustration risk profile may include information to generate weighting factors or other such information to customize a mathematical algorithm for use in generating a personalized road frustration index value associated with each of a plurality of road segments for a particular driver. For example, a total route road frustration index value may be customized for the particular road segments comprising the route and/or the individual traveling the route. For example, a road frustration index value may be calculated for a route as a sum of the road frustration index value values for the route segments that comprise the total route. Further, each route segment may be calculated as a weighted combination of road frustration risks that may be encountered as part of the particular route segment and may be customized using weighting factors (e.g., coefficient) customized for each driver.

In some cases, the road frustration index analysis engine 252 may use the frustration risk profile with or without information from other risk analysis systems 260 to generate a road frustration index value for one or more road segments on which the driver has driven. In some cases, the road frustration index analysis engine 252 may analyze the frustration risk profile with or without risk information obtained from other risk analysis systems 260 to predict a road frustration index value for one or more road segments on which the driver has not driven. For example, if a driver's frustration risk profile indicates that the driver may have problems (e.g., feel a particular level of frustration) for a particular road segment type and traffic congestion type, the road frustration index analysis engine 252 may process information about a new road segment, such as objective risk information, etc., so that the road frustration index analysis engine 252 may predict a road frustration index value that is personalized for each driver, whether or not the driver has traveled on that route segment. Additionally, or instead of, the road frustration index analysis engine 252 may use the frustration risk profile to predict road frustration index values for a type of road segment as compared to road segments that are similar, better, or worse than road segments already driven by the driver. For example, a driver may feel more frustration driving in construction zones during rush hour and may have this frustration indicator reflected in their personalized frustration risk profile. The road frustration index analysis engine 252 may then process the frustration risk profile to predict a road frustration index value for a route segment for a route to be traveled by the driver. As such, the road frustration index analysis engine 252 may process a mathematical algorithm that has been customized using the information of the frustration risk profile to predict a personalized road frustration index value for a route that the driver has not travelled. Such route segments may be used in generating a route meeting a defined road frustration index value the driver may be exposed over the whole route.

Figure 3:
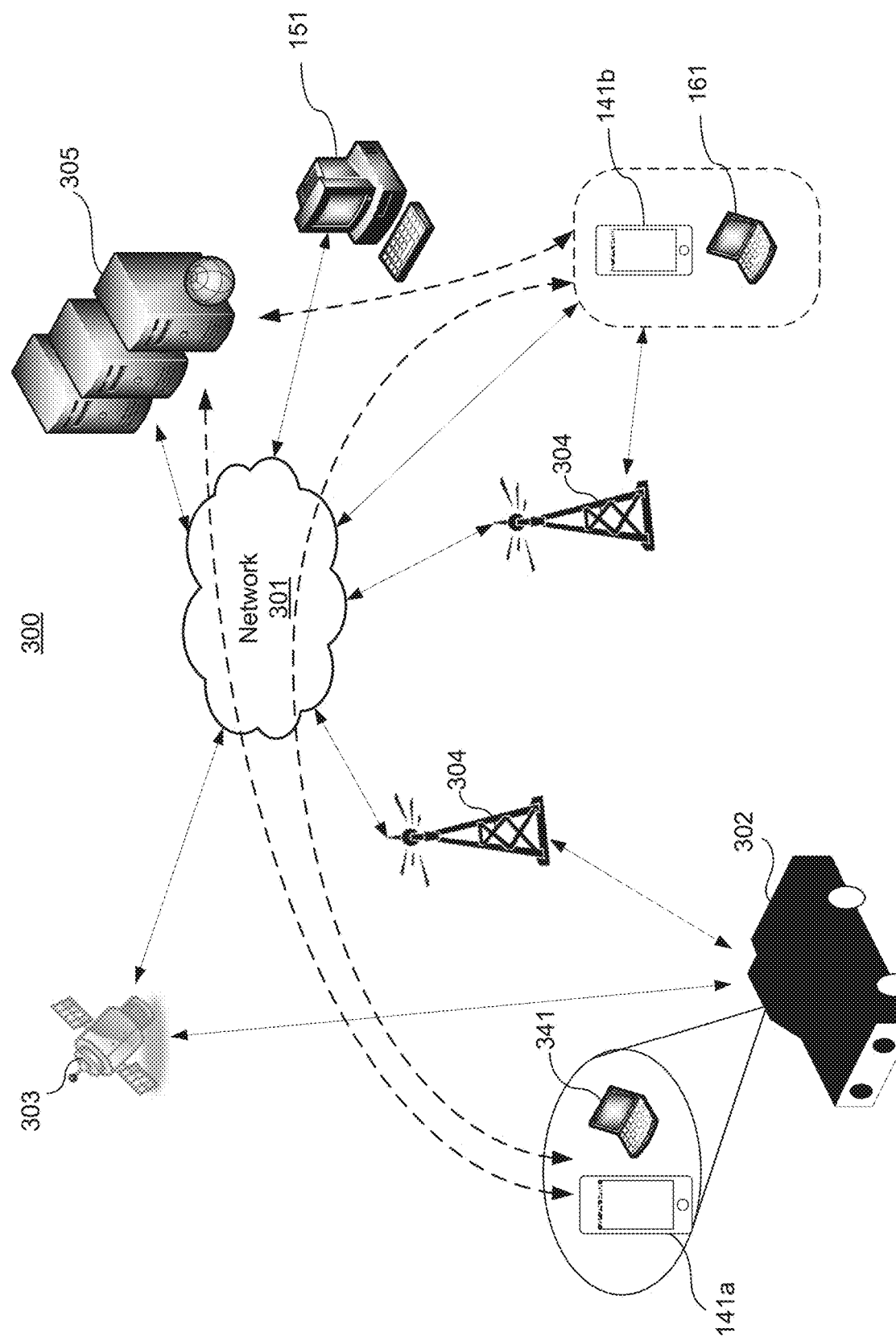
FIG. 3 depicts an illustrative block diagram of a system for generating and using driver frustration information associated with one or more users in accordance with aspects of this disclosure.

FIG. 3 shows an illustrative network environment 300 for implementing methods according to the present disclosure. The network environment 300 may include a network 301 configured to connect computing devices within or associated with a vehicle 302 (e.g., mobile computing device 141a and/or vehicle computing device 341), one or more satellites 303, one or more cellular network elements 304 (e.g., cell towers), one or more computing devices (e.g., 141b, 151, 161), and one or more application servers 305. Collectively, one or more of these computing devices may form a vehicle telematics management system. In some aspects, the mobile computing device 141a or the vehicle computing device 341 may be used interchangeably or may complete similar or identical functions or tasks. In describing different features of the present invention either the mobile computing device 141a or the vehicle computing device 341 may be referred to, however, it should be noted that any time that only one of these devices is described, the described device could be interchanged with the other device.

The network 301 may be any type of network, such as the Internet 131, a telecommunications network, etc. described above, and may use one or more communication protocols (e.g., protocols for the Internet (IP), Bluetooth, cellular communications, satellite communications, etc.) to connect computing devices and servers within the network environment 300 to send and receive communications (e.g., notifications shown as dashed arrows) between the different devices. In some cases, the network 301 may include a cellular network and its components, such as base stations. Accordingly, for example, a mobile computing device 141a (e.g., a smartphone) of a driver or passenger in a vehicle 302 may communicate, via a cellular backhaul of the network 301, with an application server 305 which in turn may communicate, via the cellular backhaul of the network 301, with computing devices or application servers (e.g., 141b, 151, 161, and 305) to provide notifications. While FIG. 3 depicts arrows pointing to the vehicle 302, it should be understood that the connections may be made with the mobile computing device 141a and/or the vehicle computing device 341 within the vehicle 302. For example, the mobile computing device 141a and/or the vehicle computing device 341 may communicate with a satellite 303 to obtain GPS coordinates or to transfer notifications to the network 301 through the satellite 303. Further, it should be understood that the mobile computing device 141a (e.g., a smartphone) may connect to the network 301 even if it is removed from the vehicle 302.

While the illustrative example of FIG. 3 shows only one vehicle 302, the vehicle telematics management system may be configured to communicate with multiple vehicles 302 simultaneously. Also, although FIG. 3 shows the vehicle 302 as a car, the vehicle 302 may be any type of vehicle, including a motorcycle, bicycle, scooter, drone (or other automated device), truck, bus, boat, plane, helicopter, etc. FIG. 3 also shows an illustrative subsystem within the network environment 300. Specifically, FIG. 3 shows an illustrative arrangement of computing devices that may exist within the vehicle 302 (and other vehicles not shown). To show these computing devices, FIG. 3 includes a view of the inside of the vehicle 302. As can be seen, the vehicle 302 may include a mobile computing device 141a and/or a vehicle computing device 341. In some embodiments, the mobile computing device 141a and the vehicle computing device 341 may communicate with one another (e.g., via BLUETOOTH). The mobile computing device 141a may be any mobile computing device (e.g., a smartphone, tablet, etc.) that is associated with a user (e.g., the driver, the passenger, etc.) of the vehicle 302. The mobile computing device 141a, the vehicle computing device 341, and/or other devices and servers (e.g., 141b, 151, 161, and 305) may be configured in a similar manner to the computing device 101 of FIG. 1A.

Further, the mobile computing device 141a and/or the vehicle computing device 241 may be configured to execute a mobile device program that provides computer-executable instructions for collecting and communicating vehicle telematics data. Also, the mobile computing device 141a and/or the vehicle computing device 341 may include a user interface for a user to provide inputs to and receive outputs from the vehicle telematics management system. Such a mobile device program may be downloaded or otherwise installed onto the mobile computing device 141a and/or the vehicle computing device 341 using one or more different methods. Once installed onto the mobile computing device 141a and/or the vehicle computing device 341, a user may launch the mobile device program by, for example, operating buttons or a touchscreen on the mobile computing device 141a and/or the vehicle computing device 341. Additionally, or alternatively, the mobile computing device 141a and/or the vehicle computing device 341 may be configured to execute a web browser (e.g., an application for accessing and navigating the Internet) to access a webpage providing an interface for the vehicle telematics management system.

In some embodiments, the mobile computing device 141a or the vehicle computing device 341 may also be configured to collect drive data using, e.g., an accelerometer, GPS, gyroscope, etc. of the mobile computing device 141a and/or the vehicle computing device 341. Drive data may include vehicle telematics data or any other data related to events occurring during a vehicle's trip (e.g., an impact to a part of the vehicle, a deployed airbag, a hard turning event, a hard braking event, an extended traffic slowdown, etc.). For example, drive data may include location information, such as GPS coordinates, indicating the geographical location of the mobile computing device 141a or the vehicle computing device 341 as well as speed and acceleration data that may be used to detect speeding, cornering, hard-braking, slow traffic and/or other such events. The mobile computing device 141a or the vehicle computing device 341 may be further configured to evaluate the drive data and to send notifications to the vehicle telematics management system (e.g., application servers 305, computing devices 141b, 151, 161, etc.). Further, the mobile computing devices 141a or the vehicle computing device 341 may send notifications to specific computing devices or servers belonging to insurance providers interested in monitoring (or tracking) users of the mobile computing device 141a or the vehicle computing device 341. As such, for example, an insurance provider via servers or computing devices (e.g., 151, 305, etc.) may monitor the driving behavior of a driver of a vehicle 302 based on notifications sent from the driver's mobile computing device 141a or the vehicle computing device 341. Also, the vehicle telematics management system may allow insurance providers to monitor driving behavior of others too. The mobile computing device 141a or the vehicle computing device 341 might not necessarily be associated with (e.g., belong to) the driver, and instead, may be associated with a passenger.

Although FIG. 2 shows a single mobile computing device 141a within the vehicle 302, in some cases the vehicle 202 may contain more or fewer mobile computing devices 141a. For example, the vehicle 302 may carry one or more passengers in addition to the driver, and each person may have one or more mobile computing devices 141a. In some cases, one or more people in the vehicle 302 may not have a mobile computing device 141a or may have left their mobile computing device 141a elsewhere. In such cases, where the vehicle 302 does not contain a mobile computing device 141a, vehicle operation may be monitored (e.g., by an insurance provider, etc.) by monitoring notifications received from the vehicle computing device 341 within the vehicle 302.

In some cases, the mobile computing device 141a and/or the vehicle computing device 341 may communicate notifications (see dashed arrows) to one or more external devices (e.g., the insurance provider computing devices). The notifications may be transmitted directly from the mobile computing device 141a or the vehicle computing device 341 to an insurance provider's computing device (e.g., 141b, 151, 161, etc.) and/or indirectly through, e.g., an application server 305 (e.g., a notification may be transmitted to an application server 305, which in turn may transmit a notification to the appropriate computing device 151).

In some cases, computing devices operated by the insurance provider may be configured to execute an insurance device program (e.g., computer-executable instructions) to establish restrictions and/or other conditions for triggering alerts based on vehicle telematics data. The insurance device program may also process computer-executable instructions to receive notifications from one or more mobile computing devices (e.g., the mobile computing device 141a, the vehicle computing device 341, etc.) and communicate parameter changes and/or other messages to the one or more mobile computing devices. The insurance device program may also provide a user interface for an insurance provider to provide inputs to and receive outputs from the vehicle telematics management system. The insurance device program may be downloaded or otherwise installed onto a computing device operated by an insurance provider one or more methods. Once installed onto the computing device, a user may launch the insurance device program by, for example, operating buttons or a touchscreen on the computing device. Additionally, or alternatively, the computing device operated by the insurance company may be configured to execute a web browser (e.g., an application for accessing and navigating the Internet) to access a web page providing an interface for the vehicle telematics management system.

As discussed above, the vehicle 302 may include the vehicle computing device 341. The vehicle computing device 341 may be configured in a similar manner to the computing device 101 of FIG. 1A. Further, the vehicle computing device 341 may be configured to execute the mobile device program in addition to, or instead of, the mobile computing device 141a. In some cases, the vehicle computing device 341 and the mobile computing device 141a may operate in conjunction so that the vehicle computing device 341 performs some modules of the mobile device program while the mobile computing device 141a performs other modules of the mobile device program. For example, the vehicle computing device may collect drive data (e.g., vehicle telematics data) and communicate the drive data, via a wired (e.g., USB) or wireless (e.g., BLUETOOTH) connection, to a mobile computing device 141a within the same vehicle 302 so that the mobile computing device 141a may evaluate the drive data and/or send notifications (providing evaluated drive data and/or raw drive data).

Further, the vehicle computing device 341 may be configured to connect to one or more devices (e.g., a GPS, sensors, etc.) installed on the vehicle 302, such as to collect the drive data. In some embodiments, the vehicle computing device 341 may be a computing system including multiple devices. For example, in some cases the vehicle computing device 341 may include the vehicle's on-board diagnostic (OBD) system. The vehicle computing device 341 may be configured to interface with one or more vehicle sensors (e.g., fuel gauge, tire pressure sensors, engine temperature sensors, etc.). The vehicle computing device may be configured to communicate directly or indirectly (e.g., through a mobile computing device 141a) with the vehicle telematics management system. In some embodiments, there might not be a vehicle computing device 341 installed on the vehicle 302 that is configurable to interface with the vehicle telematics management system, or the vehicle computing device 341 might not be able to communicate with a mobile computing device 141a.

In some cases, an autonomously controlled vehicle (e.g., the vehicle 302) may be controlled by its vehicle computing device 341 and/or a remote computing device (not shown) via the network 301 or another network. The vehicle computing device 341 may employ sensors for inputting information related to a vehicle's surroundings (e.g., distance from nearby objects) and use the inputted information to control components of the vehicle 302 to drive the vehicle 302.

In some cases, the vehicle telematics management system 300 may include one or more application servers 305. The application servers 305 may be configured to receive notifications (which may include the raw vehicle telematics data or information indicating driving events) from devices (e.g., the mobile computing device 141a, the vehicle computing device 341, etc.) and process the notifications to determine whether conditions are met (e.g., whether insurance provider restrictions have been violated). The application servers 305 may include one or more databases for associating one or more mobile computing devices 141*a* and/or one or more vehicle computing devices 341.

One or more vehicle types may be utilized by a driver in accordance with aspects of this disclosure. For example, the vehicle types may include a personal vehicle type, governmental vehicles, and/or one or more commercial vehicle types, or other vehicle types that may be subject to insurance. The personal vehicle types may include a personal vehicle registered to an individual (or an estate) including, but not limited to a car, a minivan, a van, a truck, a pickup truck, a sports utility vehicle, a recreational vehicle, a motorcycle etc. Illustrative commercial vehicle types may include fleet vehicles such as taxis, limousines, personal vehicles used for business purposes (e.g., a ride sharing business, a delivery service, a courier service, etc.). Other illustrative commercial vehicles may include trucks (e.g., a concrete transport truck, a mobile crane, a dump truck, a garbage truck, a log carrier, a refrigerator truck, a tractor unit, a platform truck, a vehicle transport truck, a flatbed truck, a box truck, a panel van, a tow truck, a canopy express, a pickup truck, a cab-forward truck, a panel truck, a panel van, an ambulance, etc.) and/or buses (e.g., a motor coach, a school bus, etc.). Other vehicles used for commercial purposes may also exist and be applicable to aspects of the disclosure. In some cases, the vehicle types may include other vehicle types that may or may not be included in the above vehicle types, such as certain governmental vehicles (e.g., certain police vehicles, fire trucks, ambulances, military vehicles, etc.), farming equipment (e.g., tractors, combines, harvesters, etc.), recreational vehicles (e.g., boats, off-road vehicles, etc.), and the like. In some cases, a business organization may operate a fleet of vehicles and may monitor or otherwise analyze a frustration level associated with each vehicle, either in near real time and/or after one or more trips have been completed for at least one vehicle in the fleet. In performing such analysis, the business organization may determine one or more times of day, weather conditions, and/or routes that are more likely to be associated with a higher level of driver frustration. As such, the business organization may be able to better manage the deployment of their vehicles to avoid, or at least minimize, the particular times of day, route segments, weather conditions which may lead to higher levels of driver frustration. An insurance company may incentivize this management of driver activity by offering a reduction in insurance costs, or other reward to the business organization.

Figure 4:
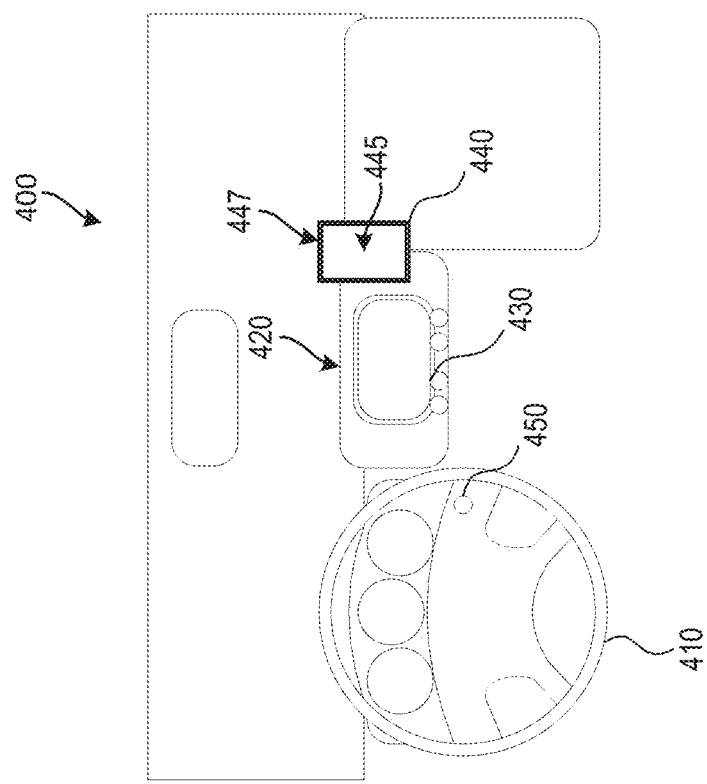
FIG. 4 shows an illustrative block diagram representation of a vehicle interior according to aspects of this disclosure.

FIG. 4 depicts an illustrative block diagram of an interior space of a vehicle 400 accessible at least to a driver of the vehicle in accordance with aspects of this disclosure. Within the interior space of the vehicle, the driver, or other occupant, may have access to one or more of a steering wheel 410, a user interface device 420 associated with the vehicle, one or more input devices 430 (e.g., a button, a knob, a touch screen interface, etc.) associated with the user interface device 420, a personal computing device 440 (e.g., the smart phone 220*a*, tablet 220*c*, laptop 220*c*, the personal navigation device 110*b*, etc.). In some cases, the personal computing device 440 may be placed in a location accessible to the driver. The personal computing device 440 may be physically mounted or otherwise secured to a surface within interior space of the vehicle. In some cases, the personal computing device 440 may not be secured to the interior of the vehicle, but located on a surface or within a cavity provided on an interior surface of the vehicle. For example, the personal computing device 440 may be placed on a table or console, or placed within a cup holder or the like. The personal computing device 440 may include one or more input devices (e.g., a physical button, a button implemented on a touch screen display 445, a microphone 447, or the like. In some cases, an affixed input device 450 may be provided and accessible to a driver or other occupant of the vehicle 210. For example, the input device may comprise a button affixed to the steering wheel or other surface readily (and safely) accessible to the driver while in motion. In other cases, the input device 450 may comprise a microphone capable of receiving an audio input from the user that may be indicative of a level of driver frustration. The input device 450 may also comprise one or more sensors capable of producing a signal representative of the driver's comfort level (e.g., level of frustration) while driving. Such input devices may include pressure sensors (e.g., near a grip area of the steering wheel 410), heartrate sensors respiration sensors, cameras, and/or the like.

In some cases, the input device 450 may be installed by a vehicle manufacturer and be permanently affixed to a surface of the vehicle interior. In other cases, the input device 450 may be installed as an after-market device. In either case, the input device may be communicatively coupled to a communication device (not shown) that may be configured to communicate the subjective risk information to one of the user device 450, such as by using Bluetooth, or other local wireless or wired communication protocol. In other cases, the input device may be configured to communicate driver frustration level information via a telecommunications network directly to the road frustration index analysis system 250. In some cases, one or more sensors may be used (e.g., biometric sensors, pressure sensors, microphones, etc.) may be used to generate a signal representative of a driver's level of frustration, without the driver consciously providing the information. For example, one or more biometric sensors may be used to sense an increase in a heart rate, breathing rate, and/or the like. In other cases, a pressure sensor may be embedded within the steering wheel of the vehicle and configured for sensing a grip pressure (e.g., an ongoing pressure). Such examples illustrative and are not to limit the sensor type or location to the enumerated examples.

In an illustrative example, the input device 450 may include one or more biometric sensors capable of sensing biometric information corresponding to the driver. The input device 450 may include a sensor for measuring a rate of a heartbeat, such as by using an infrared sensor. For example, an infrared (e.g., heat) sensor may be used to measure a heartbeat rate through the skin (e.g. of the finger) of the driver. In some cases, a heartbeat, and/or the heartbeat rate (relative to a baseline measured for the driver) may be used to determine when a user is experiencing a driving-related frustration as well as the relative level of frustration being experienced. For example, the road frustration index analysis system 250 may analyze the sensor data and relative heartbeat rate when determining the road frustration index value for each of a plurality of road segments along the route. In an illustrative example, the input device 450 may further comprise a biometric sensor measuring an eye movement, such as by using an imaging device such as a video camera, and/or a heat (infrared) sensor, etc. For example, a video camera may be located within the interior space for the vehicle 400. This video camera may be used to monitor eye activity (e.g., a movement, etc.) to determine whether a driver's eyes are relaxing and/or whether the driver is falling asleep. In another illustrative example, the video camera may capture whether a driver is intensely concentrating or looking rapidly around in many different directions to determine when a user is experiencing elevated frustration, as well as the relative level of frustration.

In an illustrative example, one or more pressure sensors may be included in the steering wheel to monitor an ongoing pressure on the wheel. For example, a time duration corresponding to a light grip pressure may be correlated to one or more route segments in which the driver has minimal stress. Similarly, a time duration corresponding to a higher grip pressure may be correlated to one or more route segments in which the driver has experienced an elevated level of stress. A short duration of higher pressure may correspond to a location along a route in which a driving event occurred. In such a manner, a driver's stress level and/or frustration level may be measured without, or with minimal, input on the driver's part. Similarly, an imaging device, such as a video camera may be positioned so that the driver's eye activity may be monitored to determine whether the driver's eyes are relaxing, if the driver is falling asleep, if the driver is intensely concentrating or looking rapidly around in many different directions. Such eye activity may be correlated to levels of low stress (e.g., relaxing eyes, falling asleep) or levels of elevated stress (e.g., intense concentration, looking rapidly, etc.). The sensors may be used instead of, or in combination, with other methods of measuring a level of driver unease (e.g., frustration). For example, one or more thermal sensors or thermal imaging sensors (e.g., an infrared sensor) may be used to monitor a driver's heartbeat, where an increasing heart rate may be correlated to an increasing level of stress. Also, if a driver's temperature is increasing (e.g., heating up) may be correlated to an increasing level of frustration, anger, or other such emotion.

In an illustrative example, the driver of the vehicle may experience one or more instances of unease at particular times and/or places along a route. In doing so, the driver may use the input device 450, 445 to indicate a current level of frustration. In doing so, the driver may generate frustration level information that may be used to determine the driver's tolerance level towards one or more types of subjective and/or objective risk (e.g., heavy traffic, poor weather conditions, etc.). When triggered, the input device 445, 447 may cause another device, such as the user device 440 to capture and/or store frustration level information corresponding to the event.

Likewise, the user device 440 may also receive other information to enhance the accuracy of the road frustration level value associated with one or more segments of a travel route. For example, the user device 440 may receive the time of day when the driver is driving (or plans to drive) through a particular travel route. This information may improve the accuracy of the calculated road frustration level value. For example, the driver may know, or suspect, that a particular segment of road through an urban area may have a higher level of traffic loading during certain times of day (e.g., from about 7 AM to about 9 AM, from about 3 PM to about 7 PM, etc.) and/or during different weather conditions (e.g., rain events, snow events, etc.). As such, the driver may experience frustration when driving along that route segment and may utilize the input 447, 450 to indicate this feeling on frustration. In some cases, this route segment through the urban area may have a higher level of traffic loading during the morning rush-hour times, than during the evening rush hour times. In such cases, the driver may not indicate any feeling of frustration when travelling this route segment during the evening. However, the driver may still experience frustration along that particular stretch of road during the morning hours. Therefore, the time of day may also be considered when determining the appropriate level of frustration. In addition, the user device 440 may receive other information to improve the accuracy of the frustration index value for a particular segment of a travel route. Some examples of this other information include, but are not limited to, the vehicle's speed compared to the posted speed limit, etc. In some cases, the user device 440 may include a location device (e.g., a global positioning device, a cellular network positioning system, etc.) to determine a location associated with the level of frustration experienced by the driver.

In some cases, such as when the user device 450 is a device capable of communication via a cellular network, the road frustration index values may be communicated from the vehicle 210 to the road frustration index analysis system 250 via the cellular network in near real-time. In other cases, the road frustration index information may be stored within a memory of the user device 440 until the user device 450 is able to communicate the information, such as when the user device is in proximity of a wireless network (e.g., a Wi-Fi network). The memory may be embodied in a non-volatile memory (e.g., in a memory in personal navigation device 110) or portable media (e.g., CD-ROM, DVD-ROM, USB flash, etc. connected to personal computing device 108).

In some cases, the vehicle computing system may be used in addition to, or in place of, one or more other components. In such cases, the vehicle computing system may be used to collect data, analyze data, calculate one or more weighting factors or otherwise customize the mathematical algorithm, and/or generate a road frustration index value for one or more route segments.

Figure 5:
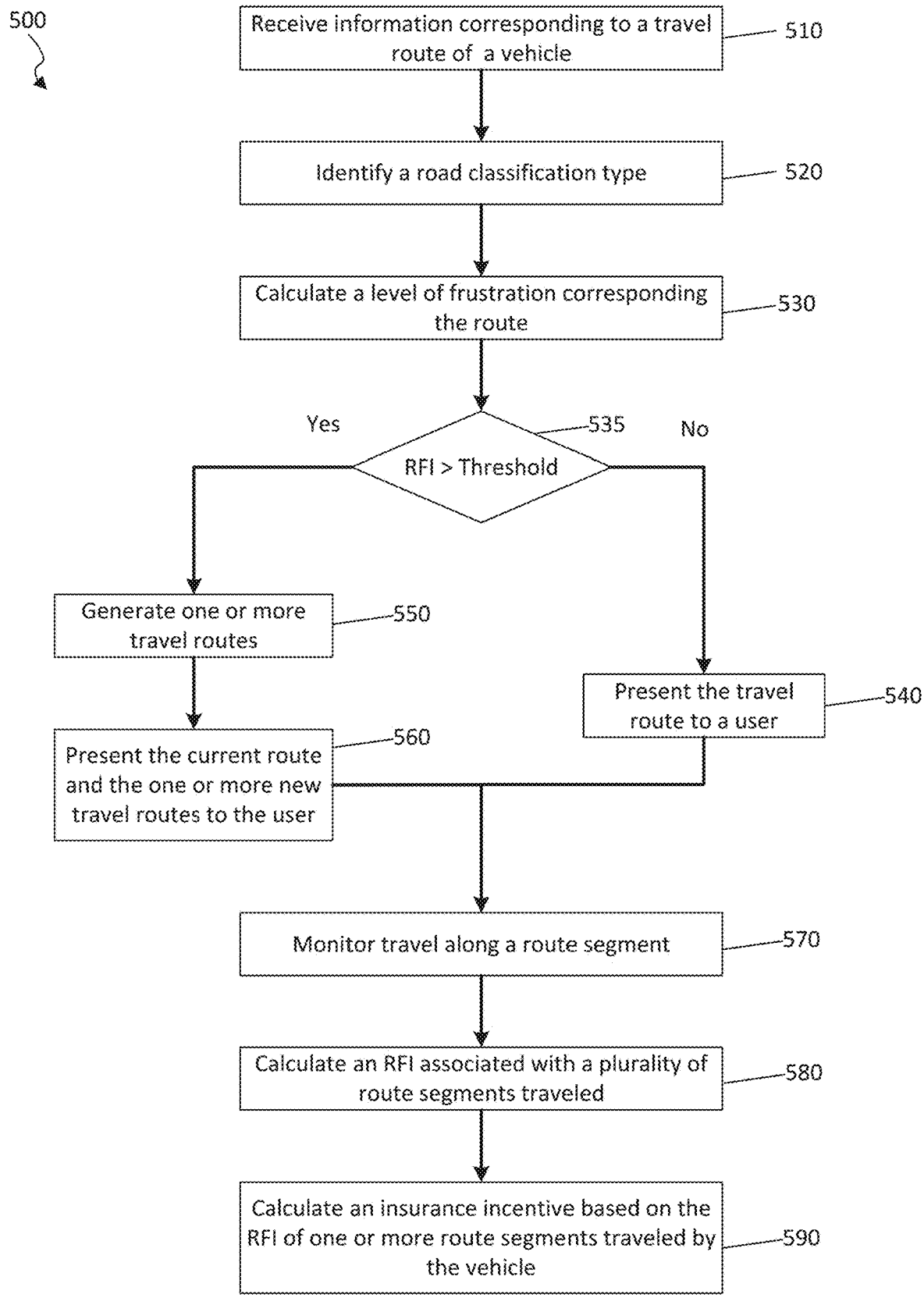
FIG. 5 shows an illustrative method for determining a frustration index value associated with frustration levels experienced by a driver of a vehicle in accordance with aspects of this disclosure.

FIG. 5 shows an illustrative method 500 to determine a road frustration index associated with a road segment in accordance with aspects of this disclosure. At 510, the road frustration analysis system 250 may receive information corresponding to a route to be traveled by a vehicle. In some cases, the road frustration analysis system 250 may receive route information before a trip begins. In some cases, the route information may be received as a vehicle travels along a route segment. In some cases, additional information about a driver of the vehicle, or the vehicle itself may be retrieved from a data store, such as from the account information database 254. This additional information may include user demographic information, car make and model information for the vehicle, driver's license information (e.g., personal driver's license, commercial driver's license, etc.), insurance policy information, a driver experience level, and the like. In some cases, this additional information may include historical information corresponding to the route, such as historical traffic information, historical weather information, and the like.

At 520, the road frustration analysis engine 252 of the road frustration index analysis system 250 may identify one or more road segments along the travel route, and in doing so, may identify a road classification type. In some cases, the road classification system may be retrieved from a database storing information associated with road speed limits, road location (e.g., city road, rural road, residential road, mountain road, and the like), and/or road classification types (e.g., interstate highway, state highway, divided highway, county road, residential road, city street, etc.). In many cases, a speed limit, or other such information (e.g., a school zone location, time restricted speed zones, traffic pattern changes, commuter lanes, etc.) may be retrieved and used by the road frustration analysis engine in determining a road frustration index value.

In some cases, the road frustration index value generated by the road frustration index analysis system 250 may be in the form of a numeric rating of a frustration that may be experienced by the driver (e.g., a rating of 0 to 10 where 1 corresponds to a low level of frustration and 10 corresponds to a high level of frustration). In some cases, the road frustration index value may be communicated in the form of a predetermined category (e.g., low frustration, medium frustration, and high frustration). At least one benefit of displaying the subjective risk score in this form is the simplicity of the resulting display for the driver and/or the ease of user in using the frustration index value in identifying a route minimizing potential frustration causing route segments that the driver may wish to avoid.

At 530, the road frustration analysis engine 252 may process instructions to calculate a road frustration index value associated with a route segment. In some cases, the road frustration analysis engine 252 may calculate the road frustration index value for a route segment in near real-time, such as for a route segment being traveled by the vehicle. In some cases, the road frustration analysis engine 252 may predict a road frustration index value for a vehicle traveling on the road segment at a future time, either as a next route or other future route segment of a route currently being traveled. In some cases, the road frustration analysis engine 252 may predict a road frustration index for one or more route segments of a route to be traveled by the vehicle at a future time or date.

In some cases, the road frustration analysis engine 252 may calculate a route frustration index value for a route segment based upon one or more models that each may be associated with a road classification type, such as a model associated with a highway and/or non-arterial roads (e.g., as shown in FIG. 7) a model associated with residential roads (e.g., as shown in FIG. 8), a model associated with country roads, etc. In some cases, the models may be modified, or may have inputs used to modify the model parameters (e.g., weighting parameters, etc.) to account for variations in road conditions that may affect a driver's perception of a frustration inducing road condition, such as traffic congestion. For example, weighting factors may be used to provide more or less weight to weather conditions (e.g., rain, snow, fog, sun, etc.) that may have an effect on traffic conditions.

Turning to FIG. 7, the road frustration index (RFI) model may correlate frustration to a percentage of rated speed at which a vehicle can travel upon a particular road segment. Such information may be gathered empirically, such as by allowing users to input a current frustration level (e.g., high, medium, low, etc.) as the vehicle travels along a route segment. Such information may be gathered at different times of day, in different weather conditions, in different road conditions (e.g., no traffic, light traffic, high congestion, construction, etc.) and processed along with the driver input information aggregated for a plurality of drivers over a period of time. For example, such information may be gathered over a period of days, weeks, months, etc. and aggregated or otherwise processed to determine ranges of speed that correspond to different levels of frustration for a driver. In some cases, this information may be used when predicting, or calculating, a road frustration index for the same road segment upon which the information was gathered. In some cases, the road frustration information models 700, 800, may be used for particular road classification types.

In the illustrative example of FIG. 7, the RFI model 700 for highways and non-arterials may include a plurality of road frustration index values ranging from a low value associated with no frustration being experienced by a driver (e.g., 0), to total frustration being experienced by the driver, such as at a road closure (e.g., 10). The speed range from 0 to the rated speed limit (and above) may be divided into a plurality of speed ranges (e.g., Range_1, Range_2, . . . Range_10, road closure, etc.), such as by defining ranges in terms of % of the rated speed limit. In some cases, a road frustration index model may use actual speed values rather than percentages. In an illustrative example, the RFI model 700 may include a first speed range corresponding to road conditions that may not preclude driving at the rated speed limit (e.g., a range x≥speed limit) may be associated with conditions that may cause little to no frustration being experienced by the driver resulting in a RFI value of 0 being associated with that particular route segment. In some cases, road conditions (e.g., traffic congestion, weather conditions, road construction conditions, time-based traffic restrictions, etc.) may cause traffic to move at speeds less than the rated speed of the road segment. In such cases, frustration may be experienced by the driver as speeds drop, and travel delays rise. This frustration may increase in a linear or non-linear manner in relation to the percentage of speed below rated speed. In the illustrative RFI model 700, the RFI values have been associated with 12 speed ranges each having an associated RFI value. In some cases, an RFI model may be linear (e.g., each speed range may be the same as or similar to each of the other speed ranges. In some cases, the RFI models may have different speed ranges for each of the such that the RFI has a non-linear distribution. For example, Range_1 corresponds to a first rage of speed from about a first percentage a % of the rated speed (e.g., 10%, 20%, 30%, etc.) corresponding to a wide range of speeds under the rated speed at which a driver may experience little frustration, with or without factors outside of vehicle speed and a road classification type, being taken into account. In some cases, an RFI model may include a linear or near linear distribution where driver frustration may be found to increase in an increasing manner, such as an approximately linear increase in frustration levels as a vehicle speed decreases from the rated speed. In the illustrative example of FIG. 7, the for vehicle speeds falling in the Range_2-Range_7 level may be increase at a steady rate as speeds go down, where each of the speed range may have a same, or nearly the same increment, such that each of the ranges including Range_2 to Range_7 may decrease by a same percentage (e.g., 3%, 4%, 5%, etc.). For example, if the speed limit for a highway road segment was 60 miles per hour, each of Range_2 to Range_7 may correspond to a range of 5% of the rated speed, such that a 3 mile per hour speed difference may cause a common increase in frustration (e.g., about 1) per 5% speed increment. As the possible vehicle speeds drop closer to 0 (e.g., under about 50% of rated speed, under about 60% of rated speed, etc.), a frustration level may increase in a highly non-linear (e.g., exponential) manner, such that speeds approaching 0 (e.g., 0.1%, 0.2%, 0.5% of rated speed), such as in Range_10, may be found to cause nearly as much frustration (e.g., an RFI value of 9.9) as a road closure (e.g., RFI value of 10). To account for errors and/or other unforeseen conditions, the model may include a known wrong RFI value (e.g., −1, −100, +100) such that an error condition in the RFI model may be easily found and corrected.

FIG. 8 shows an illustrative table corresponding to an RFI model 800 for use in determining a travel time delay associated with an illustrative road segment for a driver according to aspects of this disclosure. In some cases, the road frustration analysis engine 252 may aggregate RFI values determined for each route segment of a travel route, such as to determine a total or aggregate RFI value for the route. In some cases, the RFI model may include weighting factors, such as a Time Travel Delay (TTD) multiple that may be used in weighting an RFI value for different speed ranges that may be encountered over adjacent route segments. For example, the illustrative model may have different TTD values for different speed ranges, such that at a rated speed of a road segment, the TTD multiple may be set to a value of about 1. At a slower speed range (e.g., near about 60% of rated speed, the TTD multiple may be a higher multiple (e.g., about 1.2, about 1.5, etc.) and at a different slower speed range (e.g., about 50% of rated, about 33% of rated, etc.), the TTD multiple may increase to a higher value (e.g., about 2, about 3, etc.). As the vehicle speed approaches 0, the driver frustration may increase over time, such as in response to an increase in driving delays to reach a destination, such that a TTD multiple may increase to a notably higher value (e.g., about 8, about 8, about 10, etc.) such that the RFI value associated with a route having extended delays can more accurately reflect the frustration being experience or predicted to be experienced by a driver of a vehicle traveling on that route.

In an illustrative example, the RFI model 800 used to compute an aggregate RFI value corresponding to multiple road segments of a travel route may take into account many variables including an actual total route travel time, an expected route travel time (e.g., total_base_time), a total time spent in traffic (e.g., total_traffic_time), a total distance, which may then be used along with a TTD multiple. For example, the RFI aggregate value for a route may be calculated based on the RFI values determined for subsequent segments along the route, such as by using:

$$RFI_{Aggregate}=RFI[\text{NEXT}]+(RFI[\text{NEXT}]-RFI[\text{PREV}])/(\text{delayMult}[\text{NEXT}]-\text{delayMult}[\text{PREV}])*(\text{delayMult}[\text{ACTUAL}]-\text{delayMult}[\text{NEXT}]) \quad (1)$$

Where:
delayMult=total_traffic_time/total_base_time;
NEXT corresponds to the next route segment
PREV corresponds to the previous route segment and
ACTUAL corresponds to the current route segment To calculate an aggregate route frustration index value (e.g., a frustration trend), an illustrative method may include calculating or estimating a base time corresponding to an actual expected for traveling each route segment along a route based on rated speed for the road and/or historical traffic information and a route distance. Once calculated, for every route segment base time and distance, a time weight (Tw) parameter and a distance weight (Dw) parameter may be calculated, such as by using $$Tw_{seg}=(\text{SegBaseTime})/(\text{RouteBaseTime}); \text{ and} \quad (2)$$

$$Dw_{seg}=(\text{SegDistance})/(\text{RouteDistance}), \quad (3)$$

Where:
SegBaseTime is an expected travel time associated with traveling a particular segment;
RouteBaseTime is an expected travel time associated with traveling a particular route;
SegDistance is distance of a particular route segment; and
RouteDistance is a total distance of the route including a plurality of segments.
A Segment RFI (e.g., $RFI_{seg}$) may be calculated for each route segment and a Route RFI (e.g., $RFI_{route}$) where the segment RFI, $RFI_{seg}$, may be retrieved from an RFI model look-up table, such as RFI model 700 or RFI model 800, based at least on a vehicle speed, a rated speed, and a road type for a vehicle traveling or predicted to be traveling on the particular route. The RFI aggregate value for the route may be calculated as:

$$RFI_{route}=\Sigma_i RFI_{route}[\text{Segment}_i]*Dw[\text{Segment}_i] \quad (4)$$

Returning to FIG. 5, at 535, an RFI value (e.g., a segment RFI, a route aggregate RFI, etc.) may be compared to a criterion, such as a threshold RFI value corresponding to a frustration level at which a driver may be at greater risk of performing risky driving events, and/or may be subject to risky driving events performed by another driver in proximity to the driver's vehicle. If the RFI value is not greater than the threshold, the travel route may be presented to the user for use in navigating between a start location and an end location at 540. If, at 535, the RFI value meets the criterion (greater than, greater than or equal to, etc.) the criterion, then the road frustration index analysis system 250 may be used to access the mapping information 270, the route frustration models, and/or additional information (e.g., weather information, traffic information, objective risk information, subjective risk information, etc.) when generating one or more alternate travel routes or route segments between the desired start location and end location of a trip at 550. The RFI values may be calculates for each of the newly generated routes, similarly to 530, and then one or more of the routes may be presented to the user at 560.

At 570, the route frustration index engine 252 may monitor the vehicle's trip, such as analyzing locally to a computing device (e.g., a smartphone, a laptop, a vehicle computing system, etc.) associated with the vehicle and/or by using information (e.g., vehicle speed, vehicle acceleration, location information, etc.) communicated from the vehicle to a remotely located route frustration index computing system 250. The route frustration index engine 252 may compute an RFI value associated with a plurality of route segments along and/or near the route being traveled by the vehicle at 580.

At 590, an insurance computing system may receive route frustration index information and may process such information to generate an insurance premium and/or an incentive corresponding to insurance coverage for a driver based on a road frustration index values associated with a route traveled in the vehicle. For example, a use-based insurance product may process RFI values associated with a route segment and provide an insurance premium value based at least in part on the RFI value and/or an associated insurance risk associated with the RFI value. In some cases, the driver may receive an insurance credit deposited into an account when a travel route having an RFI less than the threshold value is chosen over another route having a higher associated RFI value. Such insurance incentives are illustrative and other such insurance incentives may be possible.

In some cases, under the Environmental Risk Variable (ERV) approach and in accordance with aspects of this disclosure, each point of risk associated with driver frustration and an RFI level has a risk value that may reflect any or all information that is not derived from recorded accidents and/or claims, but that may be the (direct or indirect) cause of an accident. In one embodiment, the risk value under the ERV approach may be derived from vehicle information transmitted by a data source 104, 106. In an alternate embodiment, the EVR approach may use compound variables based on the presence or absence of multiple route frustration considerations which are known to frequently, or severely, cause accidents. A compound variable is one that accounts for the interactions of multiple risk considerations, whether environmental or derived from recorded accidents and/or claims. For example, driving through a congested highway late at night would generate a greater RFI value than driving through similar traffic congestion at an expected time, such as during rush hour. The interaction of time of day and geographic area and/or geographic type would be the compound variable. Another example may consider current weather conditions, time of day, day of the year, and topography of the road. A compound variable may be the type of infrequent situation which warrants presenting a verbal warning to a driver (e.g., using a speaker system in a personal navigation device 110 mounted in a vehicle) of a such a route.

Another possible approach may be to calculate the route frustration index value using one or more of the approaches described above divided by the length of the route traveled. This may provide an average route frustration index value for use in conjunction with a mileage rating plan. In one embodiment, the system combines route frustration index values and conventional mileage data to calculate risk per mile rating.

In one embodiment, a device in a vehicle (e.g., personal navigation device 110, mobile device 112, etc.) may record and locally store the route and/or the route and time during which a route was traveled. This travel route information may be uploaded via wireless/wired means (e.g., cell phones, manually using a computer port, etc.). This travel route information may be used to automatically query a data source 104, 106 for route rating information and calculate a total risk value.

The route frustration index risks described above may be variables in a multivariate model of insurance losses, frequencies, severities, and/or pure premiums. Interactions of the variables would also be considered. The coefficient the model produces for each variable (along with the coefficient for any interaction terms) would be the value to apply to each subjective risk type. The user device and/or the personal navigation device 110 may initially provide the quickest/shortest route from a start location A to an end location B, and then determine the route frustration index value by determining either the sum product of the number of each route frustration index parameters and the value for that route frustration index or the overall product of the number of each route frustration index and the value for that route frustration index. (Traffic and weather conditions could either be included or excluded from the determination of the route frustration index value for comparison of routes. If not included, an adjustment may be made to the route risk value once the route has been traveled). The driver may be presented with an alternate route which is less risky than the initial route calculated. The user device and/or the personal navigation device 110b may display the difference in route frustration between the alternate routes and permit the driver to select the preferred route. In some embodiments in accordance with this disclosure, a driver/vehicle may be provided a monetary benefit (e.g., a credit towards a future insurance policy) for selecting a route having lesser route frustration index values.

In another embodiment: the insurance policy may be sold and priced in part based on where a customer falls within a three sigma distribution of risk units consumed by all insured per a typical policy period. The policy pricing may be based on an initial assumption of risk (e.g., risk due to objective risks, subjective risks, route frustration risks, etc.) to be consumed in the prospective policy period or may be based on subjective risk consumed in a preceding policy period. In a case where the number of risk units consumed is greater than estimated, the customer may be billed for the overage at the end of (or during) the policy period. In yet another embodiment, the system may be provided as a pay-as-you-drive coverage where the customer is charged in part based on the actual risk units consumed in the billing cycle. The system may include a telematics device that monitors, records, and periodically transmits the consumption of risk units to processor 114 that may automatically bill or deduct the cost from an account.

Figure 6A:
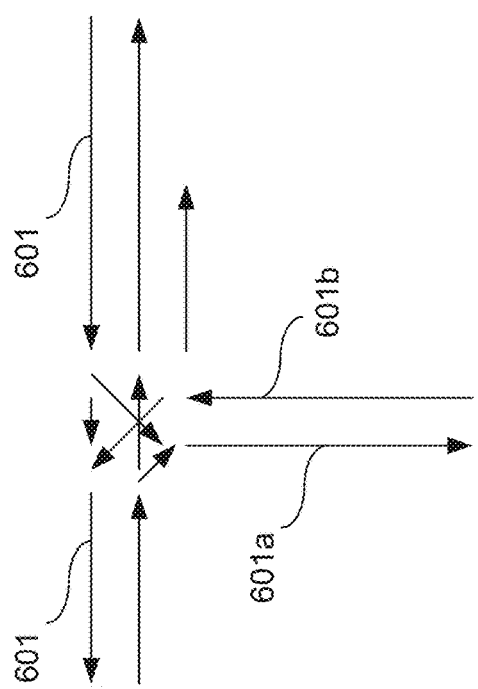
FIGS. 6A and 6B show an illustrative representation of road segments according to aspects of this disclosure.

FIG. 6A illustrates segments 601 at an example intersection between two roads. Each arrow represents a different segment of the road. A two lane road may have two segments—one for each lane. The direction of the arrow corresponds to the direction of travel for the corresponding segment. For example, referring to FIG. 6A, road segment 601a may correspond to a southbound lane of a road, whereas road segment 601b may be a northbound lane of the same road. Also, as shown in FIG. 6A, some road segments may represent turns that could be made to get from one lane on one road to another lane on another road. Accordingly, and as illustrated in FIG. 6A, segments may overlap or cross paths.

In addition, segments may have different lengths. In FIG. 6A, the road on the right of the intersection has three segments—one segment for travelling in a left direction and two segments for traveling in a right direction. Notably, one of the segments for traveling in the right direction is longer than the other. This may be because the other segment corresponds to a lane that ends (e.g., a turn lane, merge lane, or shoulder).

For ease of understanding, the segments in FIG. 6A were treated as segments of a road (e.g., road segments), but it should be understood that the intersection could be between two waterway channels or two flight paths and thus the segments could be waterway segments or airway segments. In such cases, similar principles as those discussed above for the road segments could apply.

Figure 6B:
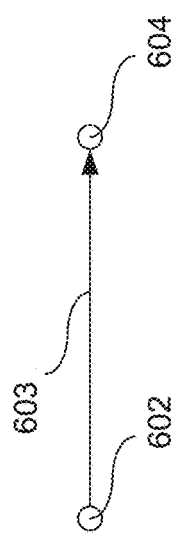

FIG. 6B illustrates an example composition of a segment. Each segment may have a starting point 602, a middle portion 603, and an ending point 604. The starting point 602 and the ending point 604 may be defined by 3D coordinates (e.g., GPS coordinates representing a latitude, longitude, and altitude). The middle portion 603 may be defined by a set of 3D coordinates or a vector.

Each segment in FIGS. 6A and 6B may be associated with a risk score. The risk score may be a value within a predefined range (e.g., 0 to 100). In some embodiments, the risk score may change over time or be variable depending on various conditions (e.g., weather, traffic, etc.). In some embodiments, the risk score of a segment may be different for different portions of the segment. For example, the risk score at the starting point 602 of a segment may be different than the risk score at the ending point 604 of the segment. The risk score throughout the middle portion 603 of the risk score may also vary.

While this disclosure has been described with respect to specific examples including presently exemplary modes of carrying out this disclosure, those skilled in the art will appreciate that there are numerous variations and permutations of the above-described systems and techniques that fall within the spirit and scope of this disclosure.

The invention claimed is:

1. A computing device comprising:
one or more processors; and
memory storing instructions that, when executed by the one or more processors, cause the computing device to:
cause display of first instructions for travel, by a vehicle, along a first route;

determine, using one or more sensors, a frustration level of a driver of a vehicle;
determine, based on the first route, an appropriate level of frustration;
determine, using the one or more sensors, an alertness of the driver;
display, based on the alertness of the driver and based on comparing the frustration level of the driver to the appropriate level of frustration, a prompt in a user interface;
receive a response to the prompt; and
cause, based on the response to the prompt, display of second instructions for travel, by the vehicle, along a second route different from the first route.

2. The computing device of claim 1, wherein the alertness of the driver corresponds to drowsiness, and wherein the second route is associated with a greater frustration level as compared with the first route.

3. The computing device of claim 1, wherein the second route is associated with a greater alertness as compared with the first route.

4. The computing device of claim 1, wherein the prompt indicates the second route.

5. The computing device of claim 1, wherein the instructions, when executed by the one or more processors, cause the computing device to determine the appropriate level of frustration by causing the computing device to:
determine a traffic loading for the first route, wherein the appropriate level of frustration is based on the traffic loading.

6. The computing device of claim 1, wherein the instructions, when executed by the one or more processors, cause the computing device to determine the appropriate level of frustration by causing the computing device to:
determine weather conditions corresponding to the first route, wherein the appropriate level of frustration is based on the weather conditions.

7. The computing device of claim 1, wherein the instructions, when executed by the one or more processors, cause the computing device to determine the appropriate level of frustration by causing the computing device to:
determine a time of day corresponding to travel, by the vehicle, along the first route, wherein the appropriate level of frustration is based on the time of day.

8. A method comprising:
causing display of first instructions for travel, by a vehicle, along a first route;
determining, using one or more sensors, a frustration level of a driver of a vehicle;
determining, based on the first route, an appropriate level of frustration;
determining, using the one or more sensors, an alertness of the driver;
displaying, based on the alertness of the driver and based on comparing the frustration level of the driver to the appropriate level of frustration, a prompt in a user interface;
receiving a response to the prompt; and
causing, based on the response to the prompt, display of second instructions for travel, by the vehicle, along a second route different from the first route.

9. The method of claim 8, wherein the alertness of the driver corresponds to drowsiness, and wherein the second route is associated with a greater frustration level as compared with the first route.

10. The method of claim 8, wherein the second route is associated with a greater alertness as compared with the first route.

11. The method of claim 8, wherein the prompt indicates the second route.

12. The method of claim 8, wherein determining the appropriate level of frustration comprises:
determining a traffic loading for the first route, wherein the appropriate level of frustration is based on the traffic loading.

13. The method of claim 8, wherein determining the appropriate level of frustration comprises:
determining weather conditions corresponding to the first route, wherein the appropriate level of frustration is based on the weather conditions.

14. The method of claim 8, wherein determining the appropriate level of frustration comprises:
determining a time of day corresponding to travel, by the vehicle, along the first route, wherein the appropriate level of frustration is based on the time of day.

15. One or more non-transitory computer-readable media storing instructions that, when executed, cause performance of steps comprising:
causing display of first instructions for travel, by a vehicle, along a first route;
determining, using one or more sensors, a frustration level of a driver of a vehicle;
determining, based on the first route, an appropriate level of frustration;
determining, using the one or more sensors, an alertness of the driver;
displaying, based on the alertness of the driver and based on comparing the frustration level of the driver to the appropriate level of frustration, a prompt in a user interface;
receiving a response to the prompt; and
causing, based on the response to the prompt, display of second instructions for travel, by the vehicle, along a second route different from the first route.

16. The computer-readable media of claim 15, wherein the alertness of the driver corresponds to drowsiness, and wherein the second route is associated with a greater frustration level as compared with the first route.

17. The computer-readable media of claim 15, wherein the second route is associated with a greater alertness as compared with the first route.

18. The computer-readable media of claim 15, wherein the prompt indicates the second route.

19. The computer-readable media of claim 15, wherein the instructions, when executed, cause determining the appropriate level of frustration by causing:
determining a traffic loading for the first route, wherein the appropriate level of frustration is based on the traffic loading.

20. The computer-readable media of claim 15, wherein the instructions, when executed, cause determining the appropriate level of frustration by causing:
determining weather conditions corresponding to the first route, wherein the appropriate level of frustration is based on the weather conditions.

* * * * *